(12) United States Patent
Sorimoto

(10) Patent No.: US 11,059,203 B2
(45) Date of Patent: Jul. 13, 2021

(54) UNDERCUT PROCESSING MECHANISM, MOLDING DIE AND MOLDED PRODUCT

(71) Applicant: TECHNOCRATS CORPORATION, Hiroshima (JP)

(72) Inventor: Masanori Sorimoto, Hiroshima (JP)

(73) Assignee: TECHNOCRATS CORPORATION, Hiroshima (JP)

( * ) Notice: Subject to any disclaimer, the term of this patent is extended or adjusted under 35 U.S.C. 154(b) by 355 days.

(21) Appl. No.: 15/394,089

(22) Filed: Dec. 29, 2016

(65) Prior Publication Data

US 2017/0297230 A1 Oct. 19, 2017

(30) Foreign Application Priority Data

Apr. 19, 2016 (JP) ............................ JP2016-083887
Sep. 7, 2016 (JP) ............................ JP2016-174179

(51) Int. Cl.
*B29C 33/44* (2006.01)
*B29C 45/44* (2006.01)
(Continued)

(52) U.S. Cl.
CPC .............. *B29C 33/44* (2013.01); *B29C 43/50* (2013.01); *B29C 45/4435* (2013.01);
(Continued)

(58) Field of Classification Search
CPC ..... B29C 45/40; B29C 45/44; B29C 45/4435; B29C 2045/445; B29C 33/44; B29C 45/4421; B29C 45/4471; B29C 33/485
(Continued)

(56) References Cited

U.S. PATENT DOCUMENTS 5,635,037 A * 6/1997 Chu ..................... G11B 5/8404
204/192.2
7,798,807 B2 9/2010 Drewlies
(Continued)

FOREIGN PATENT DOCUMENTS

CN 201471640 U 5/2010
EP 1 846 217 4/2005
(Continued)

OTHER PUBLICATIONS

Korean Office Action dated Mar. 21, 2018, in corresponding Korean Patent Application No. 10-2016-0182489, 5 pgs.
(Continued)

*Primary Examiner* — Nahida Sultana
*Assistant Examiner* — Asha A Thomas

(57) ABSTRACT

An undercut processing mechanism includes: a molding core for forming an undercut portion; an inclined pin slidable in a first direction inclined relative to a die opening direction of a molding die during the removal of a molded product from the die; and a guide rail for guiding the movement of the inclined pin. The inclined pin has a slide block movable in contact with the guide rail. The guide rail is so formed as to contact the slide block over the entire stroke of the inclined pin so that the first direction of movement of the inclined pin may be regulated, and is also so formed as to have a shape of a high bending rigidity in a particular direction of the slide block.

12 Claims, 27 Drawing Sheets

(51) Int. Cl.
    *B29C 43/50* (2006.01)
    *B29C 43/42* (2006.01)
(52) U.S. Cl.
    CPC .......... *B29C 45/4471* (2013.01); *B29C 43/42* (2013.01); *B29C 2043/503* (2013.01)
(58) Field of Classification Search
    USPC .................................................. 425/DIG. 58
    See application file for complete search history.

(56) References Cited

U.S. PATENT DOCUMENTS

| | | | |
|---|---|---|---|
| 9,308,681 B2 * | 4/2016 | Navarra Pruna | ... B29C 45/4005 |
| 2009/0304850 A1 | 12/2009 | Drewlies | |
| 2015/0209989 A1 | 7/2015 | Navarra Pruna | |

FOREIGN PATENT DOCUMENTS

| | | | |
|---|---|---|---|
| EP | 2 899 010 A1 | | 7/2015 |
| JP | 6042617 | | 3/1985 |
| JP | 61-87918 | | 6/1986 |
| JP | 1-228808 | | 9/1989 |
| JP | 3004752 | | 9/1994 |
| JP | 7-32370 | | 2/1995 |
| JP | 8238647 | | 9/1996 |
| JP | 9-66547 | | 3/1997 |
| JP | 2000-246739 | | 9/2000 |
| JP | 2001-79898 | | 3/2001 |
| JP | 2003-231160 | | 8/2003 |
| JP | 2003-320561 | | 11/2003 |
| JP | 2007-283746 | | 11/2007 |
| JP | 2007283746 A | * | 11/2007 |
| JP | 3148047 | | 1/2009 |
| KR | 10-0817689 | | 3/2008 |

OTHER PUBLICATIONS

European Office Action dated Jun. 4, 2018 in corresponding European Patent Application No. 17 150 308.9, 6 pgs.
Chinese Office Action dated Nov. 29, 2018 in corresponding Chinese Patent Application No. 201611244971.6, 7 pages.
Korean Office Action dated Sep. 29, 2018 in corresponding Korean Patent Application No. 10-2016-0182489.
Extended European Search Report dated Jul. 25, 2017 in corresponding European Patent Application No. 17150308.9.
Decision of Grant dated Jun. 28, 2019 in related Korean Patent Application No. 10-2016-0182489 (2 pages).
Korean Office Action dated Apr. 30, 2019 in corresponding Korean Patent Application No. 10-2016-0182489 (3 pages).
Notice of Reasons for Refusal, dated Aug. 27, 2020, in corresponding Japanese Application No. 2016-174179 (8 pp.).

* cited by examiner

UNDERCUT PROCESSING MECHANISM, MOLDING DIE AND MOLDED PRODUCT

CROSS REFERENCE TO THE RELATED APPLICATION

This application is based on and claims Convention priority to Japanese patent application No. 2016-083887, filed Apr. 19, 2016, and also to Japanese patent application No. 2016-174179, filed Sep. 7, 2016, the entire disclosure of which are herein incorporated by reference as a part of this application.

BACKGROUND OF THE INVENTION

Field of the Invention

The present invention relates to an undercut processing mechanism, which is used in the form as fitted to a molding die for molding a molded product having an undercut portion, the molding die and the molded product.

Description of Related Art

In a molding die for molding a molded product having an undercut portion defined therein, a variety of undercut processing mechanisms have been developed to meet with corresponding shapes of the undercut portions. The undercut processing mechanism include, as one of numerous types thereof, a so-called loose core structure generally known in the art.

The conventional typical loose core structure includes a block known as a loose core (or a molding core) for molding an undercut portion, an inclined pin connecting with the loose core, and a slide unit connected with a terminal end of the inclined pin. The slide unit has an ejector plate incorporated therein. When the ejector plate is moved in a direction conforming to the direction of separation of the die, the slide unit moves in operative association with the movement of the ejector plate in a direction conforming to the direction of pull-out of the molding core from the undercut portion. By so doing, the loose core is moved through the inclined pin in a direction conforming to the direction of pull-out from the undercut portion relative to the ejector plate to enable the loose core to be removed from the undercut portion.

With the loose core structure of the construction described above, it has been pointed out that in the event of movement or jamming occurring in the slide unit, the load and the bending moment are concentrated on a terminal end portion of the inclined pin to such an extent that the inclined pin may be deformed or broken. Also, since the load imposed on the inclined pin increases as the angle of inclination of the inclined pin increases, the deformation or the breakage thereof is apt to result in. Thereby, the inclined pin is in practice used at an angle of inclination that is virtually proximate to the upright position, and thus, the stroke of the ejector plate need be increased where a relatively large undercut portion is formed, accompanied by the consequent increase of the size of the equipment.

In an attempt to alleviate the foregoing problems and inconveniences, JP Laid-open Patent Publication No. H07-032370, for example, discloses the loose core structure in which the inclined pin is reinforced with the utilization of a guide rod, comprised of the same angle of inclination as that of the inclined pin, and a slide base (slide unit) for connecting the angular pion with the guide rod. In the loose core structure disclosed in JP Laid-open Patent Publication No. H07-032370 referred to above, the guide rod is allowed to withstand the load and the bending moment to thereby avoid the concentration of the load and the bending moment on the inclined pin, and, therefore, the inclined pin is prevented from being deformed and/or broken.

However, the prior art structure has such demerits that as compared with the conventional loose core structure the structure is complicated and that the addition of the guide rod has led to the increase of the space required. In order to resolve those demerits, the molding die equipped with the improved loose core structure have been suggested in, for example, JP Laid-open Patent Publication No. 2003-320561 and JP Laid-open Patent Publication No. 2007-283746.

The loose core structure disclosed as used on the molding die disclosed in JP Laid-open Patent Publication No. 2003-320561 referred to above is of such a simplified structure including a guide member slidably movable on a rod holder that is connected with the terminal end of the inclined pin so that the load and the bending movement imposed on the inclined pin during the mold clamping can be supported by the guide member for the purpose of avoiding the increase in size and weight of the equipment. According to this structure, the inclined pin can be reinforced during the mold clamping, but reinforcement against the load and the bending moment imposed on the inclined pin due to slide or jamming occurring cannot be accomplished during the mold opening, particularly when the loose core is pulled out of the undercut portion.

In the loose core structure employed in the molding die disclosed in JP Laid-open Patent Publication No. 2007-283746 referred to above, the use is made of a guide sleeve, through which the inclined pin is slidingly inserted, so that the inclined pin and the guide sleeve are disposed coaxially with each other so as to accomplish space saving and simplification of the structure. According to this structure, the space saving can be achieved while the inclined pin is reinforced by the guide sleeve, but as compared with the loose core structure according to any one of JP Laid-open Patent Publication No. H07-032370 and JP Laid-open Patent Publication No. 2003-320561 discussed above, it appears that the load and the bending movement that can be tolerated are relatively low.

SUMMARY OF THE INVENTION

In view of the foregoing, it is an object of the present invention to provide an undercut processing mechanism, a molding die and a molded product all of which can secure a sufficient mechanical strength against the load and the bending moment while the space saving is accomplished.

In order to accomplish the foregoing object of the present invention, there is, in accordance with a first aspect of the present invention, provided an undercut processing mechanism which is fitted to a molding die for forming a molded product having an undercut portion and which includes a molding core for forming the undercut portion, which mechanism includes: an inclined pin movable in a first direction inclined relative to a die opening direction of the molding die at the time of removal of the molded article from the die, to allow the removal of the molding core from the undercut portion; and a guide section configured to guide the movement of the inclined pin, wherein the inclined pin has a slide portion slidable in contact with the guide section. In which case, the guide section is so shaped as to contact the slide portion over an entire stroke of the inclined pin so that the first direction of movement of the inclined pin can be regulated, and is so shaped as to have a bending rigidity higher in a particular direction of the slide portion.

In the present invention, the guide section referred to above may have at least the second portion being formed to have a shape in which the bending rigidity in a direction conformable to the particular direction of the slide portion is high as compared with when at least portion thereof is a cylinder or a cylinder having a slit defined in a portion thereof.

In present invention, the guide section referred to above may have one or more flat surface in an outer peripheral surface thereof.

In the present invention, the guide section referred to above may have one or more wavy surface in an outer peripheral surface thereof.

In the present invention, the guide section referred to above may have one or more curve shaped surface in an outer peripheral surface thereof.

In the present invention, the slide portion and the guide section, both referred to above, may have respective slide surfaces slidable in contact with each other and lying parallel relative to the first direction of movement of the inclined pin; and in which a portion or the whole of the slide surface lies linear when viewed in section.

In the present invention, a portion or the whole of the slide surface referred to above may be represented by a linear shape that lies perpendicular to the direction of movement of the molding core and/or parallel thereto.

In the present invention, the guide section referred to above may include a plurality of members each having a slide surface slidable together with the slide portion and constrained while sandwiching at least a portion of the slide portion.

In the present invention, the inclined pin referred to above may include a pin main body having one end connecting with the molding core and the other end that is connected with the slide portion, and each of one end and the other end of the pin main body may be provided with male and female screw threads that are counter threaded to each other.

In the present invention, the guide section and/or the slide portion, both referred to above, may have a dovetail groove, and the guide section guides the slide portion through the dovetail groove.

In another aspect of the present invention, the present invention provides a molding die including the undercut processing mechanism referred to above.

In a further aspect of the present invention, the present invention provides a molded product formed by the use of the undercut processing mechanism referred to above or the molding die referred to above.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views.

The accompanying drawings include.

DESCRIPTION OF PREFERRED EMBODIMENTS

Figure 1:
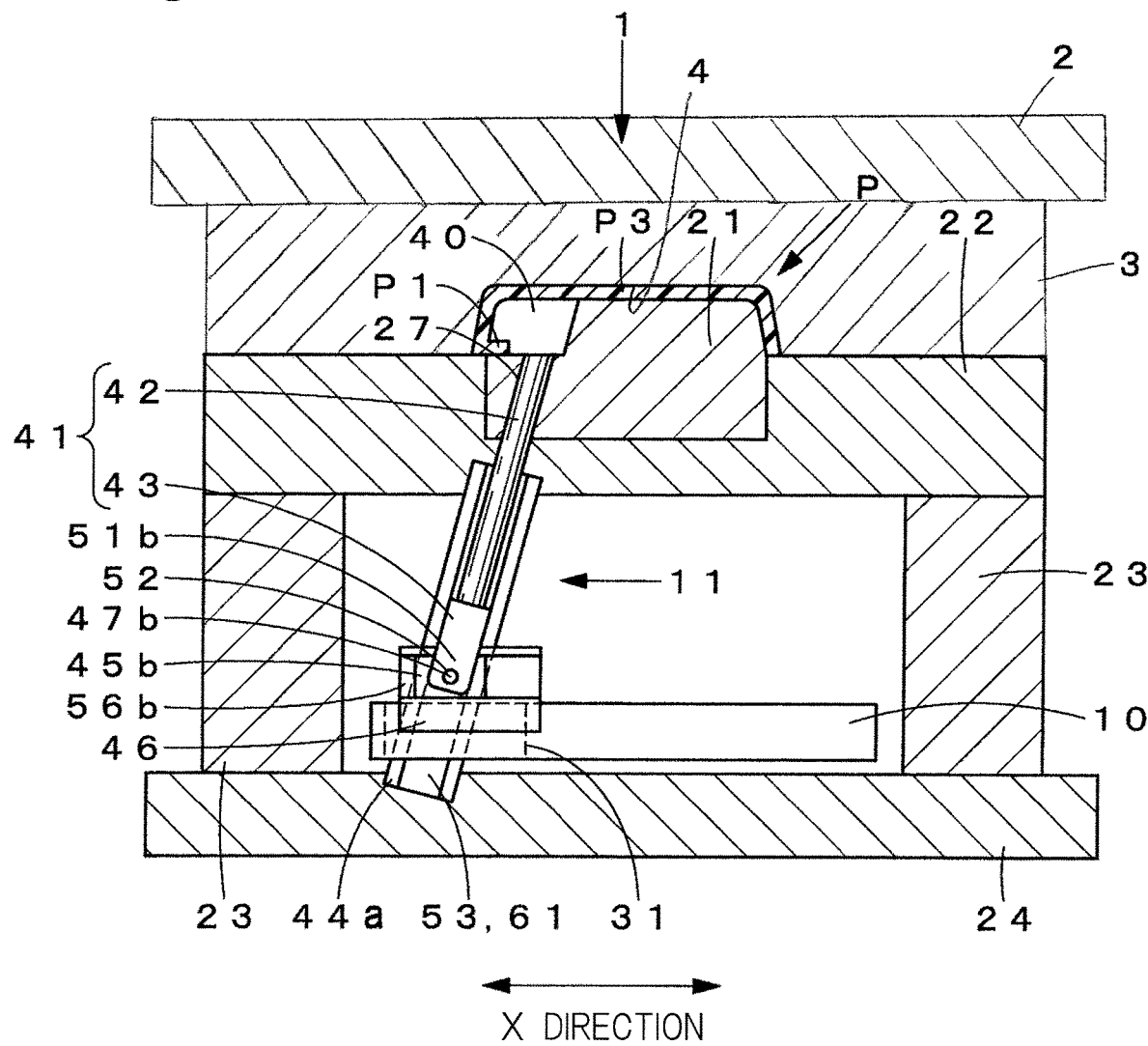
FIG. 1 is a longitudinal sectional view, as viewed in a front elevation, of a molding die according to a first preferred embodiment of the present invention.
Figure 2:
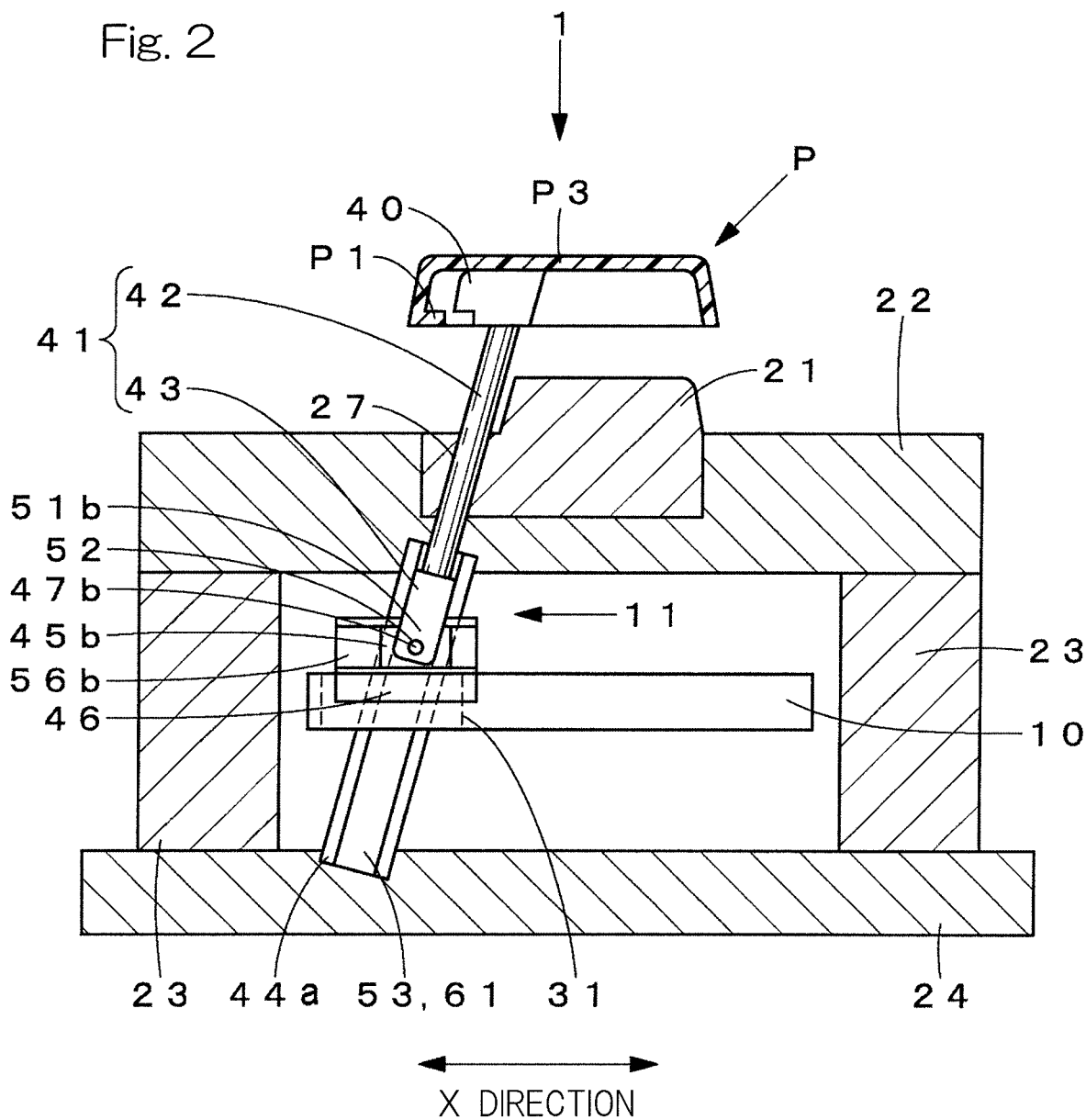
FIG. 2 is a longitudinal sectional view showing a condition assumed by the molding die, shown in FIG. 1, after an ejecting operation.
Figure 3:
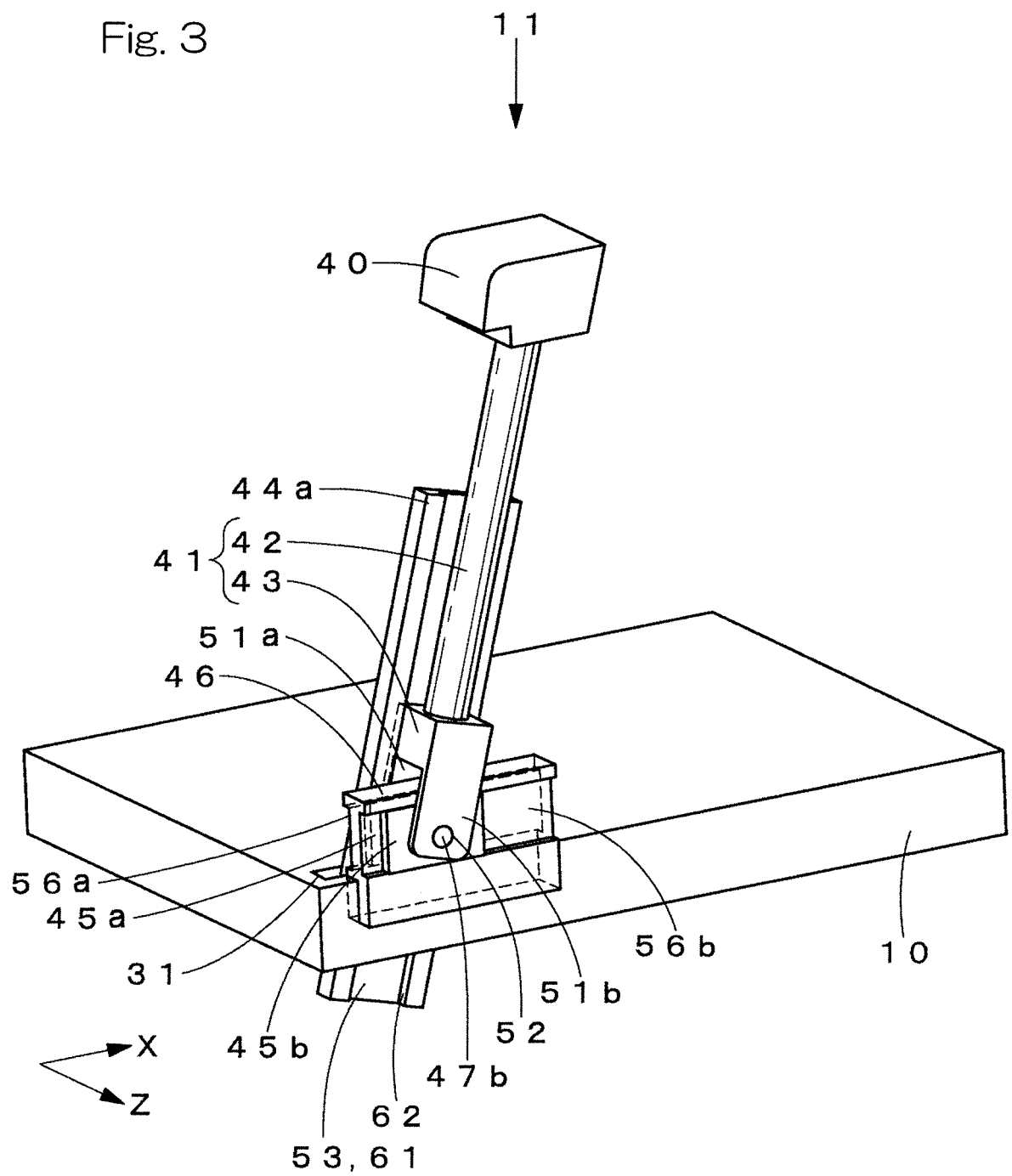
FIG. 3 is a perspective view of a front side of an ejector plate and an undercut processing mechanism for the molding die 1 shown in FIG. 1.
Figure 4:
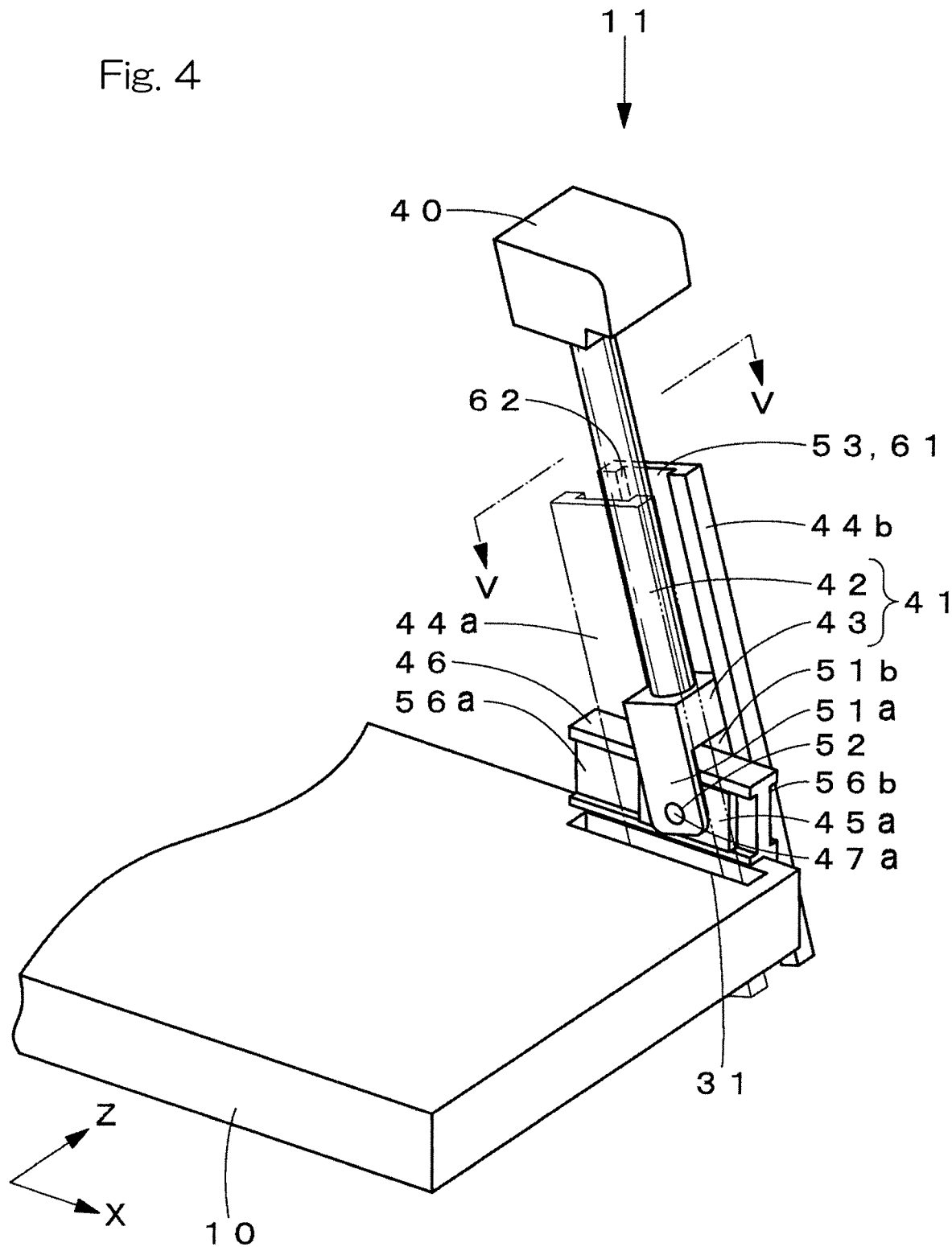
FIG. 4 is a perspective view of a rear side of the ejector plate and the undercut processing mechanism for the molding die shown in FIG. 1.
Figure 5:
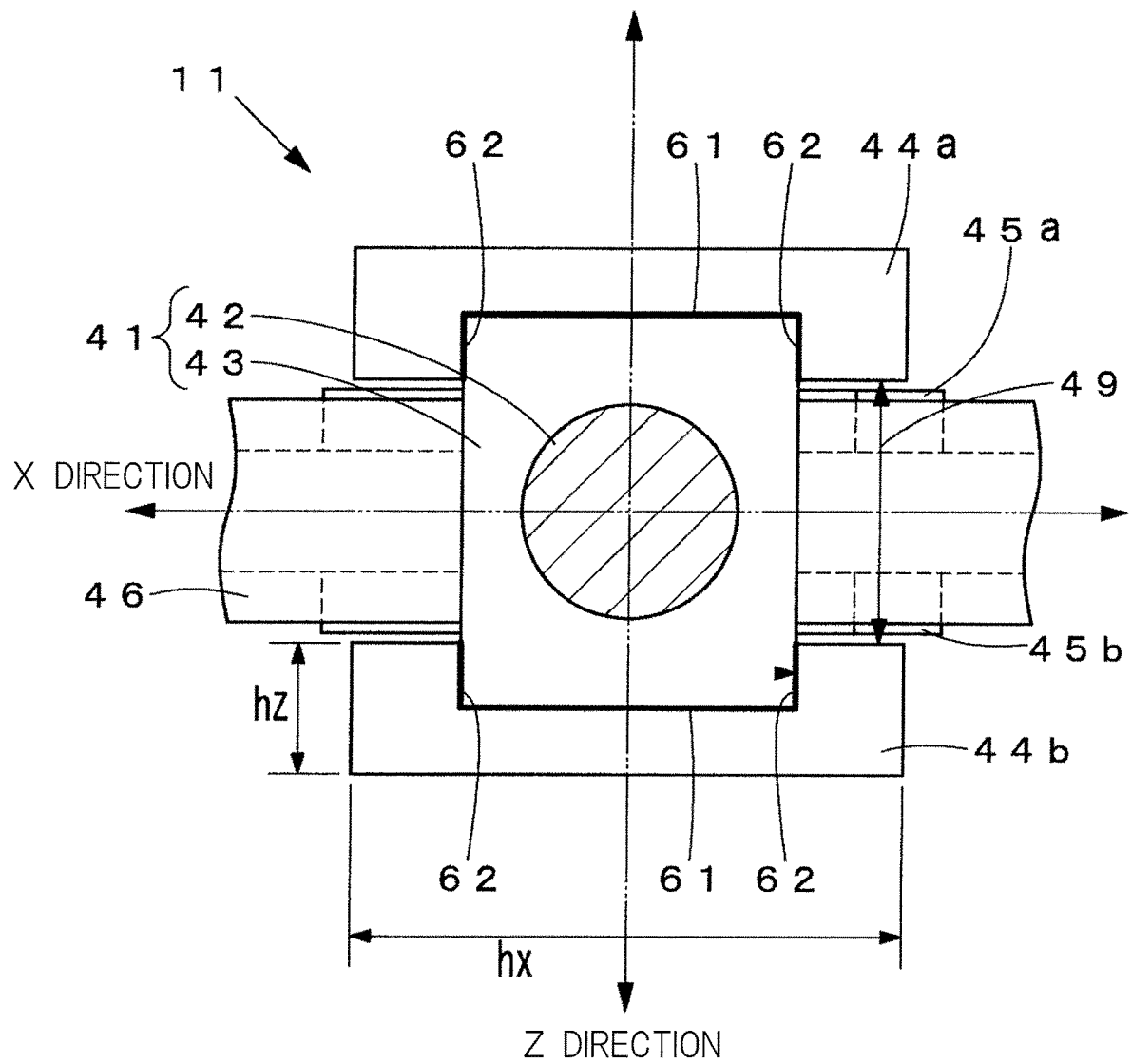
FIG. 5 is a cross sectional view take along the cut line V-V in FIG. 4.
Figure 6:
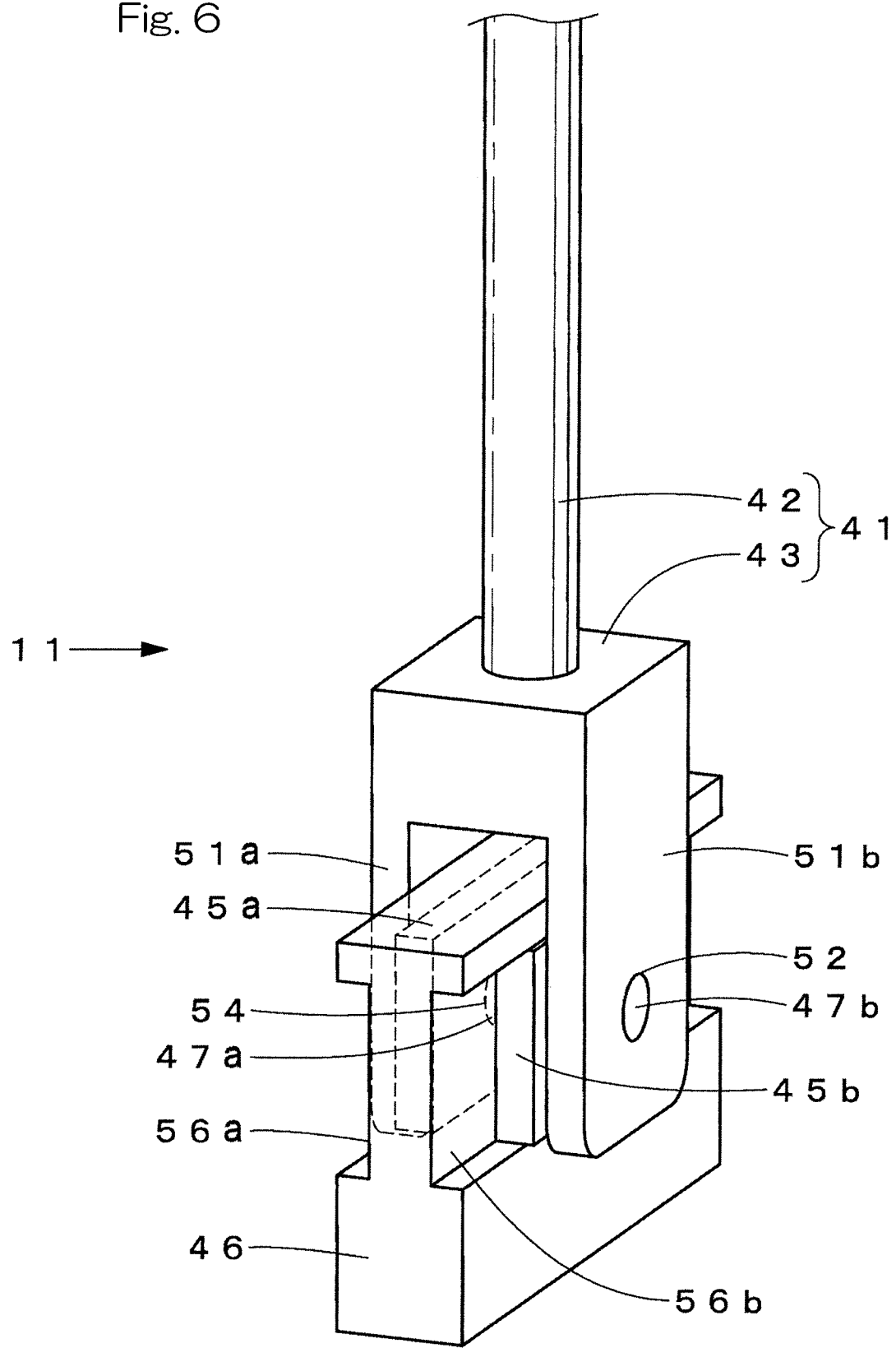
FIG. 6 is a fragmentary enlarged perspective view of the undercut processing mechanism for the molding die shown in FIG. 1.

FIG. 1 is a longitudinal sectional view of a molding die 1 according to a first preferred embodiment of the present invention as viewed in a front elevation, and FIG. 2 is a longitudinal sectional view showing a condition assumed by the molding die 1, shown in FIG. 1, after the ejecting operation. FIG. 3 is a perspective view of a front side of an ejector plate 10 and an undercut processing mechanism 11 for the molding die 1 shown in FIG. 1, and FIG. 4 is a perspective view of a rear side of the ejector plate 10 and the undercut processing mechanism 11 for the molding die 1 shown in FIG. 1, FIG. 5 is a cross sectional view take along the cut line V-V in FIG. 4, and FIG. 6 is a fragmentary enlarged perspective view of the undercut processing mechanism 11 for the molding die 1 shown in FIG. 1.

It is to be noted that in FIGS. 1 and 2, the ejector plate 10 and the undercut processing mechanism 11 are shown in a front elevational view and the hatchings are not shown therein. Also, in FIGS. 1 to 3, a guide rail 44a in one of the undercut processing mechanisms 11 is not shown, and in FIG. 4, the guide rail 44a of one of the undercut processing mechanisms 11 is shown by a double dotted line. In FIG. 5, a slide surface is shown by a heavy line and the ejector plate 10 is not shown. Also, in the description of the present invention that follows, the side of a molded product P and the side of the ejector plate 10, both shown in FIG. 1, are to be understood as upper and lower regions, respectively.

The molding die 1 according to the first preferred embodiment of the present invention is incorporated in a molding die device (not shown) and is used to form the molded product P having an undercut portion P1 defined therein. The molded product P has the undercut portion P1 defined therein so as to protrude inwardly from a portion of edges of a molded product main body P3 of a shape similar to a tray.

The molding die 1 referred to above includes, in a similar way to the construction of any known molding die for forming a molded product with an undercut portion defined therein, a fixed side template 3 fixed to a fixed side mounting plate 2 of a molding die device (not shown) and a movable side template 22 fixed to a movable side mounting plate 24 of the molding die device through a spacer block 23 for movement up and down. The molding die 1 also includes: a core 21 for forming the molded product P, which core 21 is fixed in position as inserted into the movable side template 22; the ejector plate 10 capable of moving up and down relative to the movable side template 22 to perform the ejecting operation on the molded product P which has been formed; and an undercut processing mechanism 11 drivingly associated with the ejector plate 10 during the ejecting operation of the molded product P so as to leave the undercut portion P1.

In the core 21 and the movable side template 22, a throughhole 27 is defined, into which a pin main body 42 of an inclined pin 41 of the undercut processing mechanism 11 as will be detailed later can be inserted. It is to be noted that in the conventional loose core structure, the inclined pin is guided by the throughhole 27 or through a member such as, for example, bushing fitted to the throughhole 27, but in the undercut processing mechanism 11 for the molding die 1 according to the embodiment now under discussion, a slide block 43 of the inclined pin 41 as will be described later is guided by guide rails 44a and 44b and, accordingly, neither any dimensional accuracy nor any member for guiding the inclined pin 41 in the throughhole 27 is needed. It is, however, to be noted that the present invention does not deny the use of any structure for allowing the pin main body 42 to be slid within the throughhole 27.

The ejector plate 10 is in the form of a flat plate member and has an insertion hole 31 defined therein for passage therethrough of the guide rail 44a of the undercut processing mechanism 11 as will be described in detail later. While the details of a drive mechanism for the ejector plate 10 are not specifically described here, as is the case with any known mechanism employed in the known molding die, such a design has been made that during the ejecting operation after the die opening (during the die opening) the elector plate 10 may be elevated relative to the movable side template 22.

The undercut processing mechanism 11 includes: a molding core 40 for shaping the molded product P; an inclined pin 41 connected with a bottom surface of the molding core 40 for reciprocate movement in an apparently inclined direction (first direction) relative to the direction of die clamping and opening of the molding die 1 or a die opening direction; two guide rails 44a and 44b which serve as a guide section for guiding the inclined pin 41; two slide plates 45a and 45b connected with the slide block 43 defined in a base end of the inclined pin 41 for reciprocate movement in a direction conforming to the direction of ejection (ejecting direction, i.e., X direction shown in FIG. 5) of the undercut portion P1 in driving association with the ejector plate 10; a slide base 46 for guiding the slide plates 45a and 45b that are fixed to the ejector plate 10; and two connecting pins 47a and 47b for connecting the slide block 43 and the two slide plates 45a and 45b with each other. The undercut processing mechanism 11 is so designed that the molding core 40 can undergo a reciprocal movement in a direction along the ejecting direction (right-left direction in FIG. 1, i.e., X direction shown in FIG. 5) of the undercut portion P1 relative to the molded product P in driving association with the up-down movement of the ejector plate 10.

The molding core 40 is a block member so machined as to assume a shape following the shape of the undercut portion P1 of the molded produce P and its vicinity so that the molded product P can be formed together with the core 21 (and a cavity 4 in the fixed side template 3).

The inclined pin 41 includes the pin main body 42, which is an elongated round member, and the slide block 43 connected with the terminal end (lower end) of the pin main body 42 and is so disposed with an upper end of the pin main body 42 fixed to the bottom surface of the molding core 40 in a condition inclined relative to the direction of movement of the ejector plate 10.

In the undercut processing mechanism 11 of the present embodiment, the first direction of movement of the inclined pin 41 is regulated by the guide rails 44a and 44b. Accordingly, the pin main body 42 works satisfactorily if the pin main body 42 can be made movable within the throughhole 27 and, hence, the degree of freedom in choosing the dimension and the shape is high. It is, however, to be noted that the pin main body 42 may not be necessarily limited to a round rod member, but may be in the form of a square rod member or a polygonal rod member. It is also to be noted that the manner of fixing the pin main body 42 with the molding core 40 and the slide block 43 is not necessarily limited to the specific method discussed above, but may be accomplished by threading, press-fitting, bonding or any other suitable method. Yet, it is to be noted that the pin main body 42 and the slide block 43 may not be necessarily connected together and the pin main body 42 may be rotatably connected with the slide block 43.

The angle of inclination (first direction of movement) of the inclined pin 41 is to be determined in dependence on the stroke of the ejector plate 10 and the length of ejection of the undercut portion P1. Specifically, the angle of inclination of the inclined pin 41 is so determined that the molding core 40 may be moved to a position at which the molded product P can be drawn out when the ejector plate 10 is elevated to an upper elevating end thereof (See FIG. 2).

If the angle of inclination of the inclined pin 41 is large, the stroke required to leave the undercut portion P1 will become small, but the load and the bending moment imposed on the undercut processing mechanism 11 will become high as compared with those when the angle of inclination of the inclined pin 41 is small. As will be discussed later, according to the undercut processing mechanism according to the present embodiment, the guide rails 44a and 44b that support the slide block 43 defining the fulcrum for the load and the bending moment have a high mechanical strength and, accordingly, a relatively large angle of inclination can be employed.

The slide block 43 referred to above forms a slide member of the inclined pin 41 which slides in contact with the two guide rails 44a and 44b, and defines the fulcrum of the load and the bending moment that are imposed on the inclined pin 41. This slide block 43 includes a block portion of a rectangular parallelepiped shape and two protruding pieces 51a and 51b having a predetermined thickness and extending downwardly from mutually opposed side surfaces of the block portion. The slide block 43 represents an inverted concaved shape (inverted U shape) when viewed from side as shown in FIGS. 3 and 4. In the undercut processing mechanism 11 for the molding die 1 in the practice of the embodiment now under discussion, four side surfaces of the slide block 43 define respective slide surfaces with which the guide rails 44a and 44b are slidingly engaged.

The projecting pieces 51a and 51b are connected with the respective slide plates 45a and 45b through the corresponding connecting pins 47a and 47b. For this reason, the projecting pieces 51a and 51b are formed with throughholes 52, to which the slide plates 45a and 45b are connected through the associated connecting pins 47a and 47b, with throughholes 52 being coaxially positioned relative to each other. The the slide block 43 is fixed to a lower end of the pin main body 42 so that a center axis of the throughholes 52 may be oriented in a direction perpendicular to the direction of ejection (ejecting direction) of the undercut portion P1.

The guide rails 44a and 44b are in the form of an elongated flat plate member having a channel shaped section with a guide groove 53 defined therein for receiving therein the slide block 43 and are operable to guide the slide block 43 in the first direction conforming to the direction of inclination of the inclined pin 41 while the slide block 43 is sandwiched as received within the guide groove 53 and also to support the load and the bending moment acting on the slide block 43. The guide rails 44a and 44b provide respective slide surfaces, defined by a bottom surface 61 and a side surface 62 of the guide groove 53, with which slide surfaces of the slide block 43 are slidingly engaged, and are so formed that the slide block 43 is movable without a rattling motion, since the respective slide surfaces are disposed side by side at an angle of 90°.

The guide rails 44a and 44b are of such a structure that, the slide block 43 is engaged by the guide groove 53 so that a bottom surface 61 of the guide groove 53 contacts a side surface of the slide block 43 from which the projecting pieces 51a and 51b extend and the side surfaces 62 of the guide groove 53 contact the remaining side surfaces of the slide block 43. Each of the guide rails 44a and 44b includes an upper end is fixed to the movable side template 22 and a lower and upper end fixed to the movable side mounting plate 24 in such a condition that a longitudinal axis of the guide groove 53, when viewed in a front elevational view, may be aligned with the center axis of the pin main body 42. It is to be noted that the manner in which opposite ends of the guide rails 44a and 44b are fixed is not necessarily limited to that described, but any suitable method may be employed such as, for example, fixing thereof through a fixing block member (not shown).

Also, the two guide rails 44a and 44b are disposed having been spaced a spatial distance 49 from each other so as to allow the slide base 46 to be disposed. Yet, one guide rail 44a is inserted into the insertion hole 31 in the ejector plate 10. It is to be noted that depending on the disposition of the guide rails 44 and 44b relative to the ejector plate 10, the ejector plate 10 may have two insertion holes 31 defined therein so that both of the guide rails 44a and 44b can be respectively inserted therethrough.

In the molding die 1 according to the preferred embodiment now under discussion, particularly when slide and/or jamming occur in the slide plates 45a and 45b, it may be suspected that the load and the bending moment acting in the direction of movement (X direction as shown in FIG. 5) of the molding core 40 (slide plates 45a and 45b) may be concentrated on the slide block 43. For this reason, the guide rails 44a and 44b are so formed as to have the width hx in the X direction that is large as compared with the width hz in the direction (Z direction as shown in FIG. 5) perpendicular to the X direction so that the bending rigidity of the slide block 43 in the X direction (the moment of inertia of area) is increased.

It is to be noted that in the undercut processing mechanism 11 for the molding die 1 according to the preferred embodiment now under discussion, increase of the bending rigidity in the X direction can be achieved by expanding only the width hx in the X direction of the guide rails 44a and 44b, and thus, both of the improvement of the bending rigidity in a particular direction and the space saving can be accomplished simultaneously. In contrast thereto, in the case that, for example, members corresponding to the guide rails 44a and 44b are round or cylindrical having a slit defined in a portion thereof, an attempt to increase the bending rigidity in the X direction requires an increase of the diameter not only in the X direction but also in all direction, and, therefore, the space required for installation will increase accompanied by an impediment to the space saving.

It is also to be noted that in the undercut processing mechanism and the molding die according to the present invention, the direction in which the bending rigidity is to be increased and the corresponding shape of the guide rails are not necessarily limited to respective particular parameters and it is therefore advisable that the width of the guide rails may be expanded in dependence on the direction, in which the bending rigidity is to be increased, or the shape of the guide rails may be determined in consideration with the direction in which the bending rigidity is to be increased.

In the case of the preferred embodiment now under discussion, the side surface 62 of the guide rails 44a and 44b (and the side surface of the slide block 43) which will eventually form the respective slide surfaces lies in a direction perpendicular to the X direction or a direction in which the space 49 is defined. Therefore, even though a relatively high load and a relatively high bending moment act in the X direction, no force acts in the direction in which the space 49 between the two guide rails 44a and 44b is expanded, and, therefore, expansion of the space 49 between the guide rails 44a and 44b and a possible dropout of the slide block 43 from the space 49 can be avoided.

In contrast thereto, for example, if a cylinder having a slit defined in a portion thereof is used as a member corresponding to the guide rail, which member is used to guide an inclined pin in the form of a cylindrical column or of a cylindrical shape, when the load and the bending moment act radially against the slit, a force acts in a direction in which the slit is expanded, and, therefore, the inclined pin may be dropped out from the slit as a result of the expansion of the slit.

Also, it is rather preferred that, in order to avoid any expansion of the space 49 between the guide rails 44a and 44b, the guide rails 44a and 44b are constrained by any suitable fastening element (not shown) so that such a fastening element will not hamper the movement of the ejector plate 10, the inclined pin 41 and the slide base 46.

Each of the slide plates 45a and 45b is in the form of a rectangular flat plate member having a center portion thereof formed with a throughhole 54 for passage therethrough of the connecting pin 47. The slide plates 45a and 45b are connected with inner sides of the projecting pieces 51a and 51b of the slide block 43, respectively, through the connecting pins 47a and 47b and bearings (not shown) or the like for rotation about center axes of those connecting pins 47a and 47b.

The slide base 46 is in the form of a rail shaped member having an H-shaped section and has guide grooves 56a and 56b defined in opposite surfaces for guiding the slide plates 45a and 45b in the direction of ejection (ejecting direction) of the undercut portion P1. The guide grooves 56a and 56b have opposite side surfaces held in sliding contact with upper and lower end surfaces of the slide plates 45a and 45b, respectively, and is so formed that the slide plates 45a and 45b can move without being rattled.

The slide base 46 is disposed within the space 49 between the two guide rails 44a and 44b and is fixed to the ejector plate 10 with the opposite side surfaces of the guide grooves 56a and 56b held parallel to the direction of ejection (ejecting direction) of the undercut portion P1.

The manner by which the slide base 46 is fixed is not necessarily limited to that particular method described above, but any suitable method such as, for example, the use of a press-fitted pin or bolt, press-fitting or bonding can be employed.

It is to be noted that in the molding die 1 according to the preferred embodiment now under discussion, since the ejection of the undercut portion P1 takes place in a horizontal direction, the slide base 46 is also required to be so formed as to allow the opposite side surfaces of guide grooves 56a and 56b to lie in a horizontal direction. However, where the ejection of the undercut portion P1 takes place in a direction inclined relative to the horizontal direction, the slide base 46 has to be so formed and so disposed as to allow the opposite side surfaces of the guide grooves 56a and 56b to lie parallel to the ejecting direction of the undercut portion P.

Each of the connecting pins 47a and 47b is in the form of a pin member of a cylindrical columnar shape and has the substantially same length as the sum of the throughhole 52 in one of the projecting pieces 51a (and 51b) in the slide block 43 and the throughhole 54 in one of the slide plates 45 (and 45b).

The one connecting pin 47a is fitted to the corresponding throughholes 52 and 54 in a condition with the inner side surface of the one projecting piece 51a in the slide block 43 and the one slide plates 45a held in contact with each other. The other connecting pin 47b is fitted to the corresponding throughholes 52 and 54 with the inner side surface of the other projecting piece 51b in the slide block 43 and the other slide plate 45b held in contact with each other. It is to be noted that the method of fitting those connecting pins 47a and 47b are not necessarily limited to that specific method described above.

Hereinafter, the operation of the molding die 1 according to the preferred embodiment of the present invention hereinabove discussed will be described. Upon completion of the formation of the molded product P and the die opening, the ejecting operation (removal from the die) of the molded product P is initiated. FIG. 1 illustrates a condition before the ejecting operation. At the time of ejection of the molded product P, the ejector plate 10 is elevated. As the ejector plate 10 is elevated, the slide block 43 are guided in the guide grooves 53 of the guide rails 44a and 44b, and the inclined pin 41 is elevated consequently. By so doing, the slide plates 45a and 45b are guided in the guide grooves 56a and 56b in the slide base 46 so as to move in the ejecting direction (right direction as viewed in FIG. 1) of the undercut portion P1. In other words, a movable portion of the undercut processing mechanism 11 excluding the guide rails 44a and 44b and the slide base 46 moves in the ejecting direction (right direction as viewed in FIG. 1) of the undercut portion P1 relative to the ejector plate 10.

The molding core 40 thereby moves in the projecting direction of the undercut portion P1 relative to the molded product P. Then, when the ejector plate 10 is elevated to an elevated end thereof, the molding core 40 depart from the undercut portion P1 to complete the ejection of the undercut portion P1 and, accordingly, removal of the molded product P is thus enabled (See FIG. 2).

When the ejector plate 10 descends, the movable portion of the undercut processing mechanism 11 moves in a leftward direction relative to the ejector plate 10, and the condition shown in FIG. 1 is assumed when the ejector plate 10 descends to a descended end thereof.

In the molding die 1 according to the preferred embodiment now under discussion, when any slide and/or jamming occur in the slide plates 45a and 45b during the movement of the inclined pin 41 (the ejector plate 10), relatively high load and bending moment in the X direction act on the slide portion on the slide block 43 and the guide rails 44a and 44b. However, since the guide rails 44a and 44b are so formed to such a shape that the bending rigidity in the X direction is high and the guide block 43 is supported by such guide rails 44a and 44b, deformation and breakage will hardly occur. Also, since the guide rails 44a and 44b have their opposite ends fixed to and supported by the slide block 43, deformation and breakage will further hardly occur. Accordingly, inconveniences or troubles which would occur in the slide block 43 and the guide rails 44a and 44b as a result of the deformation and breakage and the concomitance occurrence of defects in the molded product P can be avoided.

According to the molding die 1 according to the preferred embodiment now under discussion as described hereinabove, against the load and the bending moment acting on the inclined pin 41 (the slide block 43) and the guide rails 44a and 44b, a sufficient mechanical strength can be secured with a simplified construction and without using any other reinforcing members.

Accordingly, the molding die 1 and the undercut processing mechanism 11 according to the preferred embodiment now under discussion can be applied to the formation of a large molded product, which is heavy in weight, while the space saving is concurrently achieved.

Also, it is possible to increase the angle of inclination of the inclined pin 41 to a relatively large value as a result of the improvement of the mechanical strength and, hence, the degree of freedom of application of the undercut processing mechanism 11 to the molding die 1 increases. In addition, since the load and the bending moment which would act on the inclined pin 41 are supported by the slide block 43 and the guide rails 44a and 44b and neither the load nor the bending moment acts on the pin main body 42, the degree of freedom of the shape of the pin main body 42 is increased, and also the use of any other reinforcing members for the pin main body 42 is dispensed with. Hence, further space saving and further simplification of the structure of the undercut processing mechanism 11 and the molding die 1 can be achieved.

It is to be noted that in the event that in the molding die 1 according to the preferred embodiment now under discussion there is the possibility that the slide block 43 and the guide rails 44a and 44b may be deformed as a result of imposition of a local load and bending moment in a direction different from the X direction on the slide block 43 and the guide rails 44a and 44b, the sectional surface area may be locally increased to increase the mechanical strength by performing weld cladding at or on an appropriate location (direction) of the guide rails 44a and 44b.

Also, according to the molding die 1 used in the practice of the foregoing preferred embodiment of the present invention, since the side surfaces 62 or slide surfaces of the guide rails 44a and 44b (and the side surface of the slide block 43) lie perpendicular to the X direction or a direction in which the space 49 is defined between the two guide rails 44a and 44b, even when the relatively high load and bending moment act in the X direction, no force acts in any direction in which the space 49 between the two guide rails 44a and 44b may expand. Therefore, the possible dropout of the slide block 43 from the space 49 and the expansion of the space 49 between the guide rails 44a and 44b can be prevented.

According to the molding die 1 in the preferred embodiment of the present invention now under discussion, since the inclined pin 41 can be guided over the entire stroke thereof in a condition with the slide block 43 surrounded by and sandwiched between the guide rails 44a and 44b, the space saving can be realized as compared with the structure of the like in which guide shafts are disposed parallel to and spaced from the inclined pin.

Also, according to the molding die 1 in the preferred embodiment now under discussion, the undercut processing mechanism 11 is so configured with the use of members of an easily processable shape, assembly thereof is easy to accomplish and the undercut processing mechanism 11 can be easily incorporated into the movable side template 22 and the ejector plate 10. Therefore, a low cost can be realized while securing the required precision.

Figure 7:
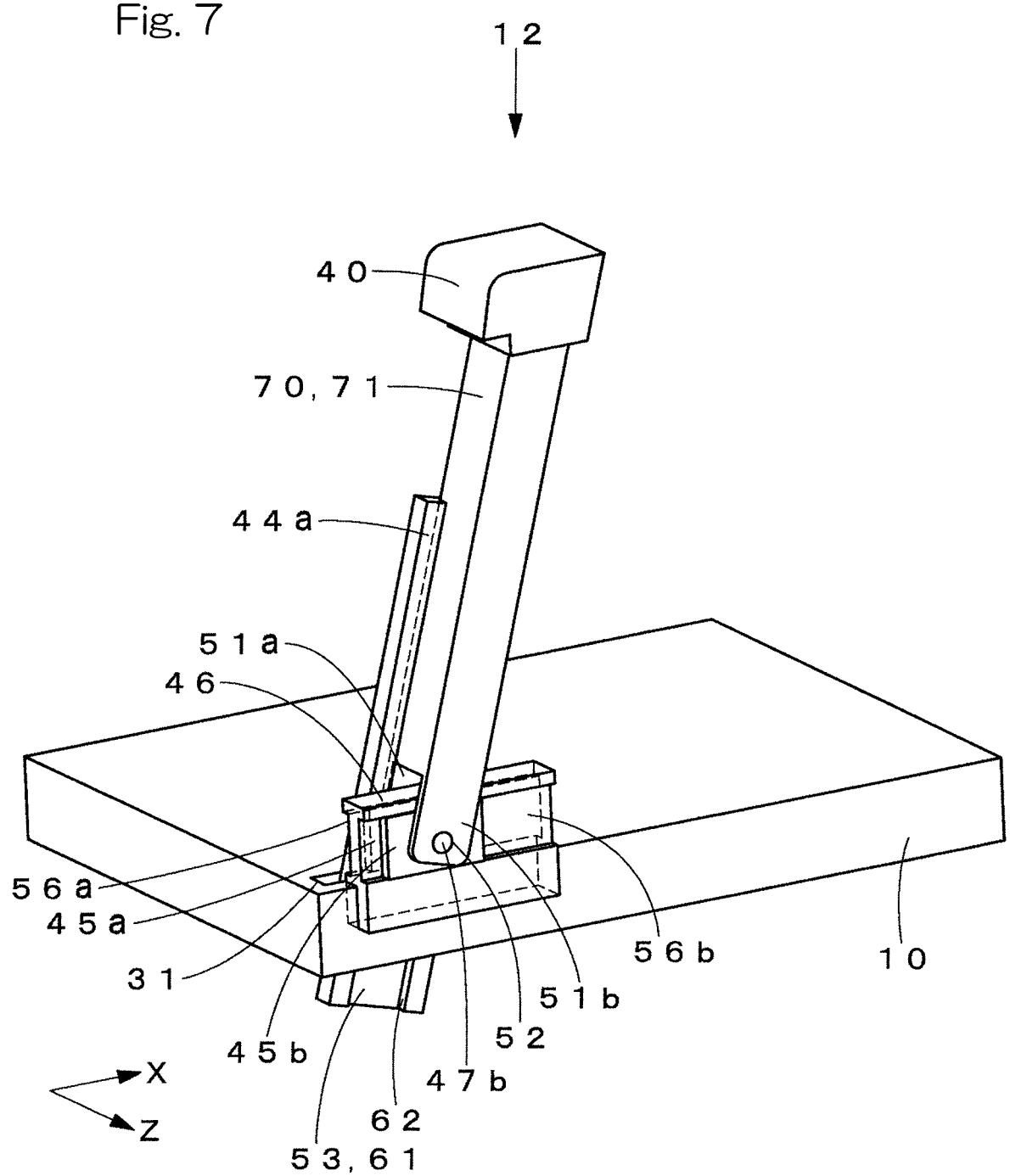
FIG. 7 is a perspective view showing a front side of the undercut processing mechanism and the ejector plate according to a second preferred embodiment of the present invention.

FIG. 7 illustrates a perspective view of a front side of the undercut processing mechanism 12 and the ejector plate 10 employed in the practice of a second preferred embodiment of the present invention. It is to be noted that, in FIG. 7, the one guide rails 44b is not shown for the sake of clarity. Structural details similar to those in the molding die 1 shown in and described with reference to FIGS. 1 to 6 in connection with the previously described first embodiment of the present invention will be described using like reference numerals and are not therefore reiterated. The undercut processing mechanism 12 according to the second embodiment has a basic construction that is similar to that of the undercut processing device 11 used in the molding die 1 according to the previously described first embodiment, except for the difference found in the form of the inclined pin now identified by 70.

The undercut processing mechanism 12 according to the second embodiment is such that the pin main body and the slide block of the inclined pin 70 are integrated together. Specifically, the pin main body is formed in the form in which the slide block 71, which is a rectangular sectioned rod member, is elongated, with its upper end fixed to an undersurface of the molding core 40.

As discussed above, in the undercut processing mechanism and the molding die according to the present invention, the pin main body and the slide block of the inclined pin can be integrated together.

Figure 8:
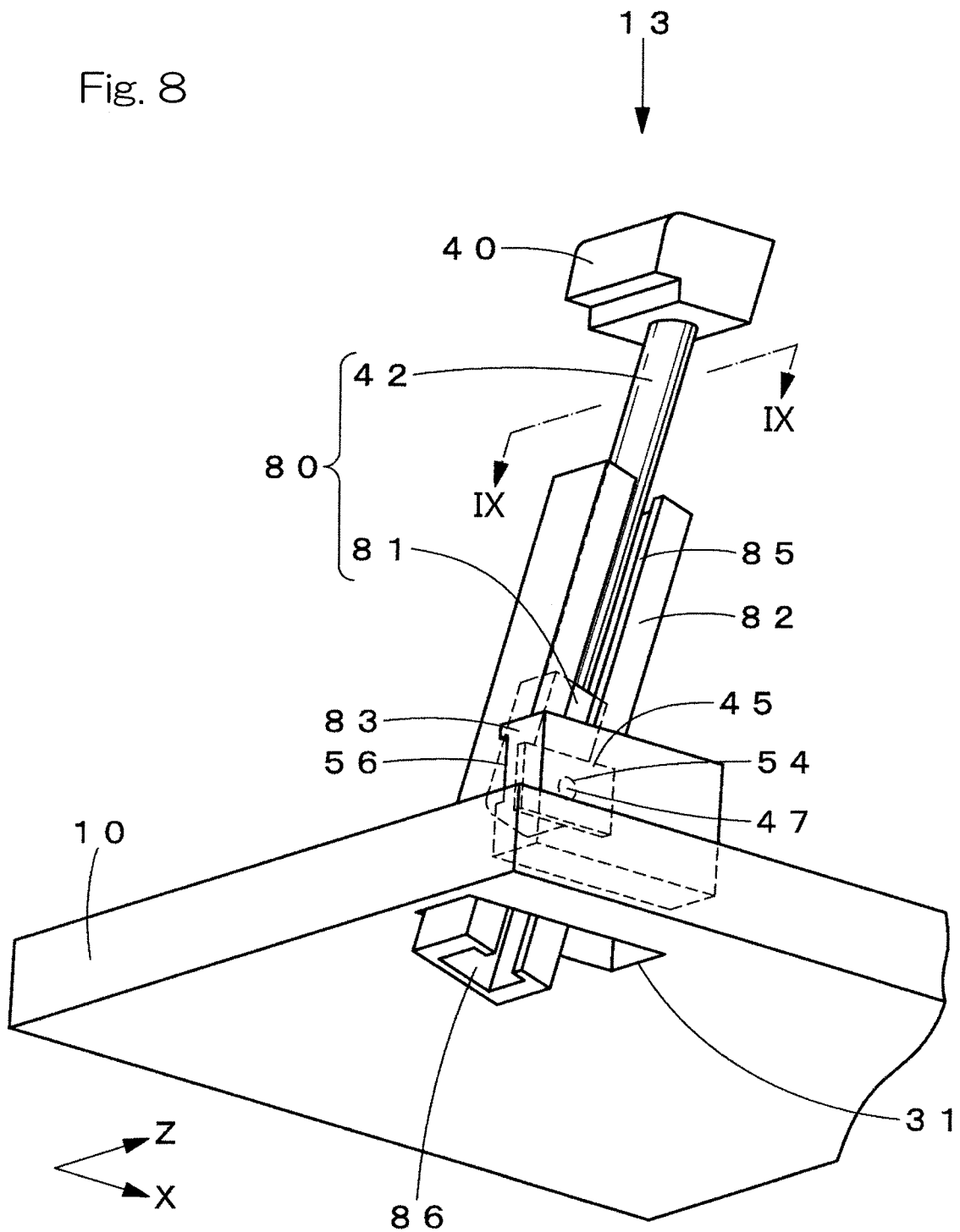
FIG. 8 is a perspective view showing the undercut processing mechanism and the ejector plate according to a third preferred embodiment of the present invention as viewed from below on the front side.
Figure 9:
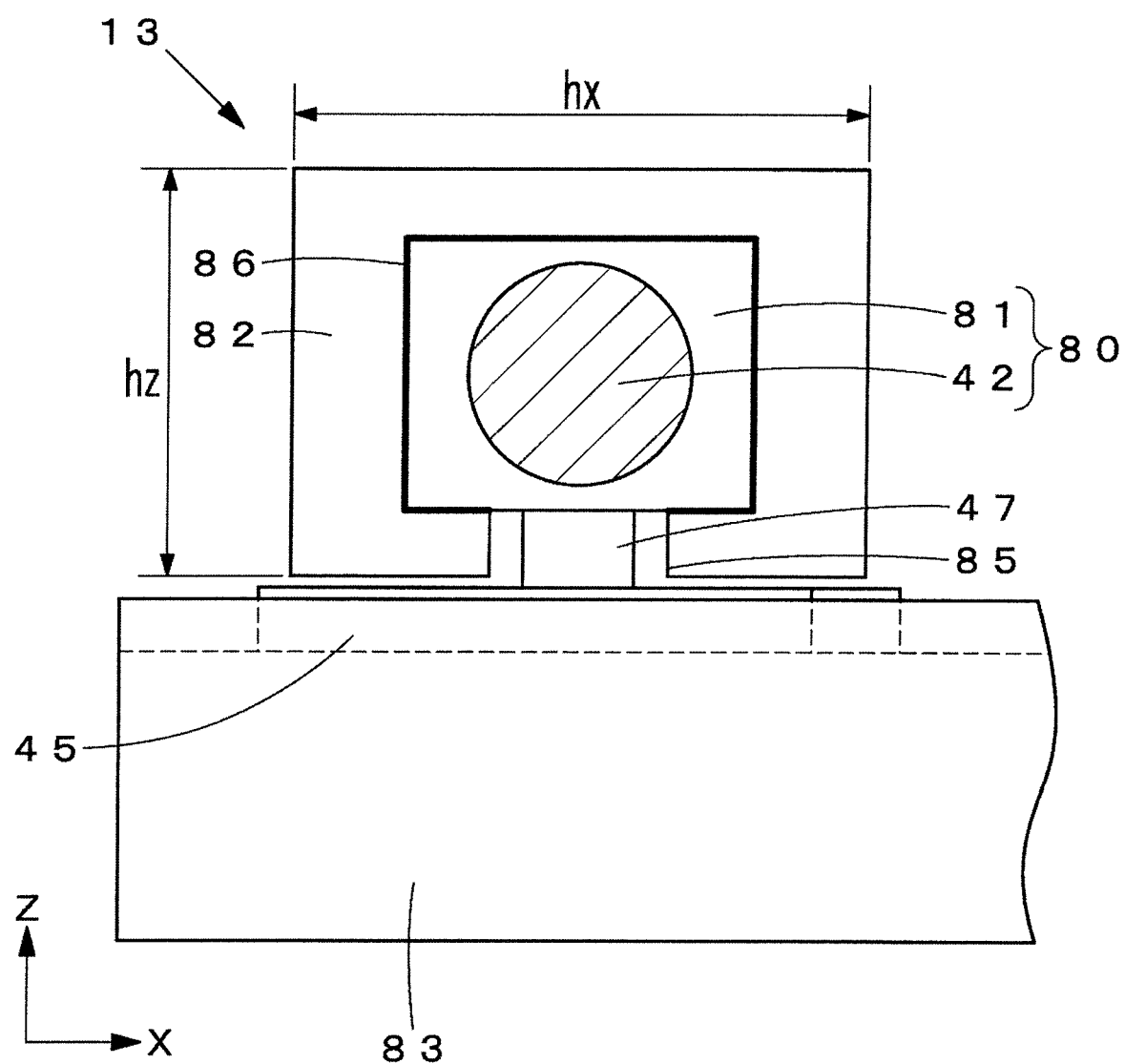
FIG. 9 is a cross sectional view taken along the cut line IX-IX in FIG. 8.

FIG. 8 illustrates a perspective view of the undercut processing mechanism 13 and the ejector plate 10, as viewed from below of the front side thereof, both of which are employed in the practice of a third preferred embodiment of the present invention. FIG. 9 is a cross sectional view taken along the line IX-IX in FIG. 8. It is to be noted that, in FIG. 9, the slide surface is shown by a heavy line, and the ejector plate 10 is not shown for the sake of brevity. Structural details similar to those in the molding die 1 shown in and described with reference to FIGS. 1 to 6 in connection with the previously described first embodiment of the present invention will be described using like reference numerals and are not therefore reiterated.

The undercut processing mechanism 13 according to the third embodiment has a basic structure that is similar to that of the undercut processing mechanism 11 used in the molding die 1 according to the previously described first embodiment, but employs the inclined pin 80, the guide rail 82 and the slide base 83, which are different in shape from the counterparts used in the practice of the previously described first embodiment, and the connecting pin 47 of a different length. Also, in the third embodiment, each of the guide rail 82, the slide plate 45 and the connecting pin 47 is singular in number.

In the undercut processing mechanism 13 according to the third preferred embodiment now under discussion, the slide block 81 of the inclined pin 80 is in the form of a block member of a rectangular parallelopiped shape having no projecting piece, the guide rail 82 is in the form of a square columnar member having a C-shaped section, and the slide base 83 is in the form of a block member having a rectangular parallelopiped shape having one guide groove 56 defined therein.

The slide block 81 is in the form of a block member of a rectangular parallelopiped shape with a short side portion at the undersurface is rounded and has a throughhole (not shown) for fitting the connecting pin 47, which throughhole is formed in a lower intermediate portion of the side surface of a front surface side (slide base 83 side). The slide block 81 includes four side surfaces slidable to the guide rail 82.

The slide plate 45 is rotatably connected with the slide block 81 for rotation around a center axis of the connecting pin 47.

The guide rail 82 is in the form of a square columnar member having a slit 85 defined in a side surface on the front surface side for passage of the connecting pin 47 so that the slide block 81 can be moved. The slit 85 is formed in shape similar to a rectangular dovetail groove (See FIG. 9). The guide rail 82 includes an inner peripheral surface 86 forming a slide surface which slides together with a slide surface of the slide block 81. Also, the guide rail 82 has a width hx in the X direction which is large as compared with the width hz in the Z direction so that the bending rigidity in the X direction is higher than that in the Z direction, in a manner similar to the guide rails 44a and 44b of the first embodiment.

The slide base 83 is fixed to the ejector plate 10 so that the guide groove 56 may fact towards the rear surface side (guide rail 82 side).

The connecting pin 47 has a length larger than the sum of respective lengths of the throughhole in the slide block 81 and the throughhole 54 in the slide plate 45 by a distance corresponding to the length through which the connecting pin 47 passes through the slit 85.

The function of the undercut processing mechanism 13 according to the preferred third embodiment now under discussion is identical to that of the undercut processing mechanism 11 for the molding die 1 according to the previously first described embodiment and, therefore, the details thereof are not reiterated for the sake of brevity.

According to the undercut processing mechanism 13 of the third embodiment now under discussion, the guide rail 82, the slide plate 45 and the connecting pin 47 are each employed in one in number and, therefore, the number of component parts is reduced as compared with that in the undercut processing mechanism 11 for the molding die 1 of the previously described first embodiment and is, hence, effective to reduce the cost and the weight thereof. It is, however, to be noted that, in order to increase the mechanical strength, a structure having symmetry, such as shown and described in connection with the undercut processing mechanism 11 for the molding die 1 according to the previously described first embodiment, is preferred.

Figure 10:
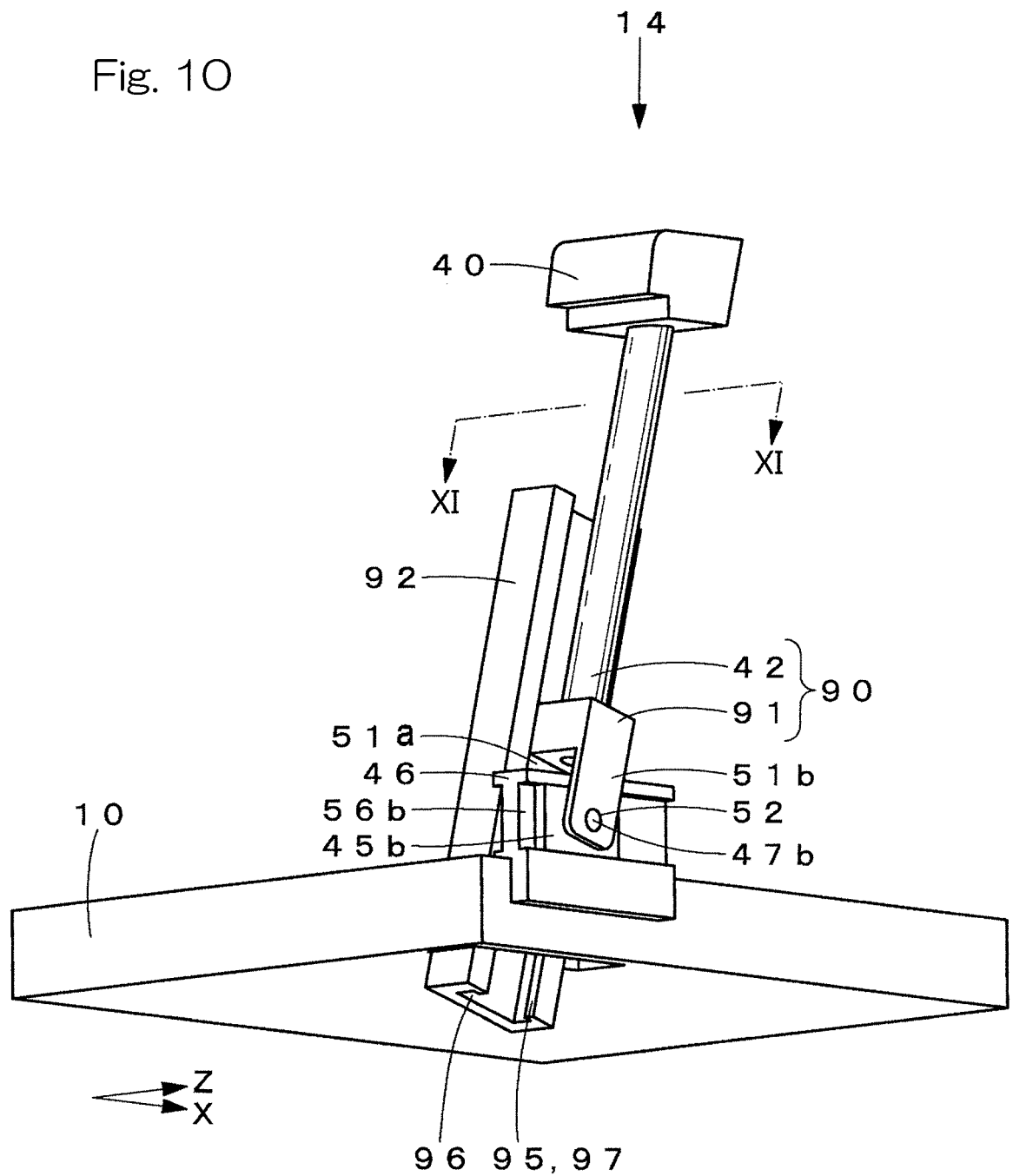
FIG. 10 is a perspective view showing the undercut processing mechanism and the ejector plate according to a fourth preferred embodiment of the present invention as viewed from below on the front side.
Figure 11:
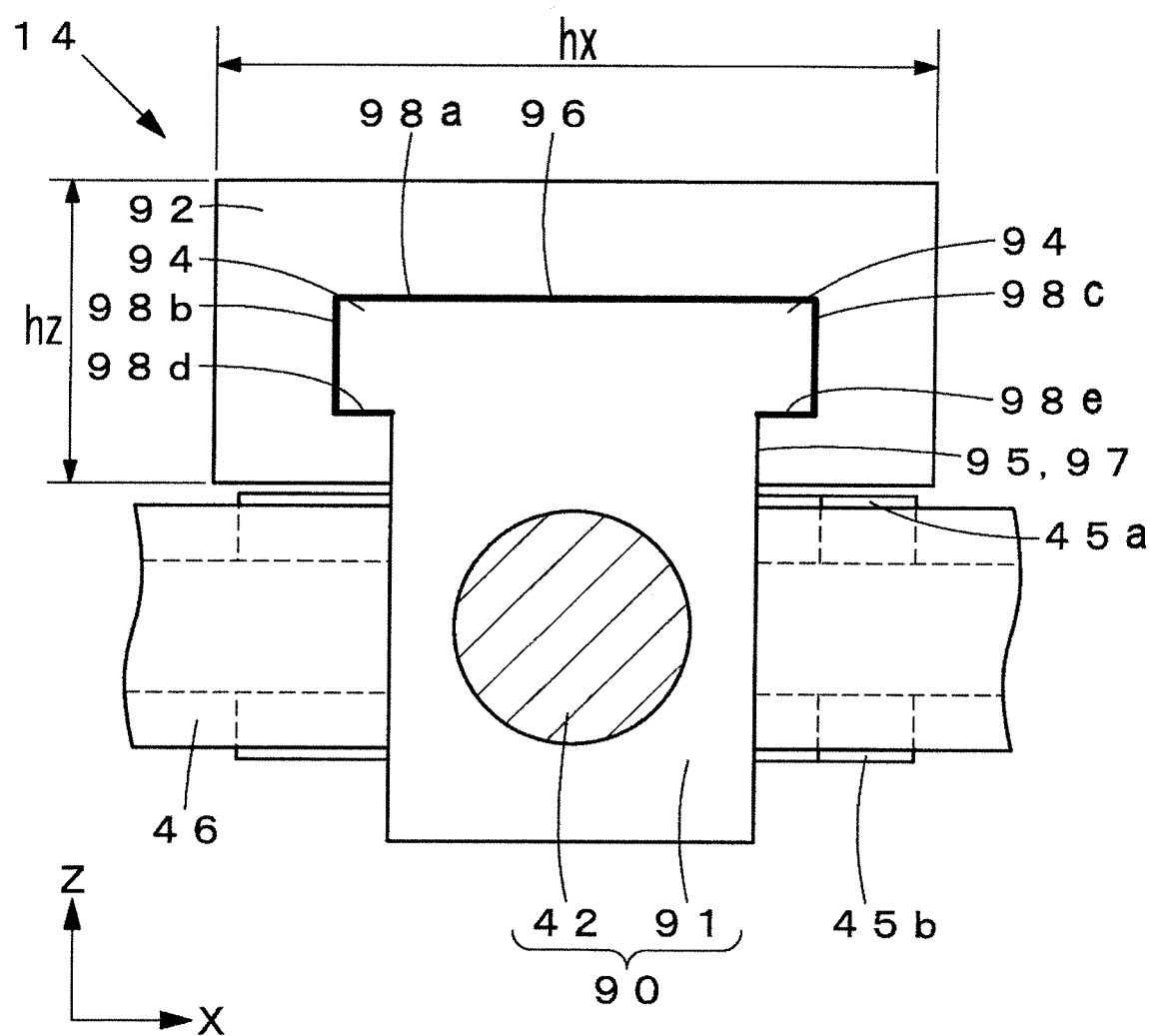
FIG. 11 is a cross sectional view taken along the cut line XI-XI in FIG. 10.

FIG. 10 is a perspective view, showing the undercut processing mechanism 14 and the ejector plate 10 according to a fourth preferred embodiment of the present invention as viewed from below the front surface side. FIG. 11 is a cross sectional view taken along the cut line XI-XI in FIG. 10. It is to be noted that in FIG. 11, the slide surface is shown by a heavy line and the ejector plate 10 is not shown for the purpose of clarity. Component parts similar to those employed in the molding die 1 according to the previously described first embodiment shown in FIGS. 1 to 6 are shown by like reference numerals and, therefore, the details thereof are not reiterated for the sake of brevity.

Although the undercut processing mechanism 14 according to the fourth embodiment now under discussion has a basic structure that is the same as the undercut processing mechanism 11 for the molding die 1 according to the previously described first embodiment, but the inclined pin 90 and the guide rail 92 are different in shape from those employed in the undercut processing mechanism 11 according to the previously described first embodiment, and only one guide rail 92 is employed.

In the undercut processing mechanism 14 according to the fourth embodiment now under discussion, the slide block 91 for the inclined pin 90 is in the form of a block of a convexed sectional shape in which a collar portion 94 slidable in engagement with the guide rail 92 is formed, and, accordingly, the guide rail 92 is in the form of a square columnar member which is formed with a slit 95 that permits the slide block 91 to be movable in engagement with the slide block 91. The guide rail 92 represents a dovetail groove shape when viewed in a transverse section (as shown in FIG. 11).

With the undercut processing mechanism 14 according to the fourth embodiment now under discussion, in the slide block 91, five side surfaces 98a to 98e all cooperating with each other to form the collar portion 94 define a slide surface along which the guide rail 92 slides and, the guide rail 92 includes an inner peripheral surface 96 serving as a slide surface along that slides over the slide surface of the slide block 91. Also, the end surface 97, forming the slit 95 for the guide rail 92, and a portion of the side surface of the slide block 91, which faces the end surface 97 may form respective slide surfaces that slide relative to each other.

Also, in a manner similar to the guide rails 44a and 44b in the molding die 1 according to the previously described first embodiment, the guide rail 92 has the width hx in the X direction that is larger than the width hz in the Z direction and has the bending rigidity in the X direction that is higher than that in the Z direction.

As is the case with the undercut processing mechanism 14 according to the fourth embodiment now under discussion, in the undercut processing mechanism of the present invention, the slide block in its entirety for the inclined pin 90 may not be necessarily surrounded by the guide rail.

Figure 12:
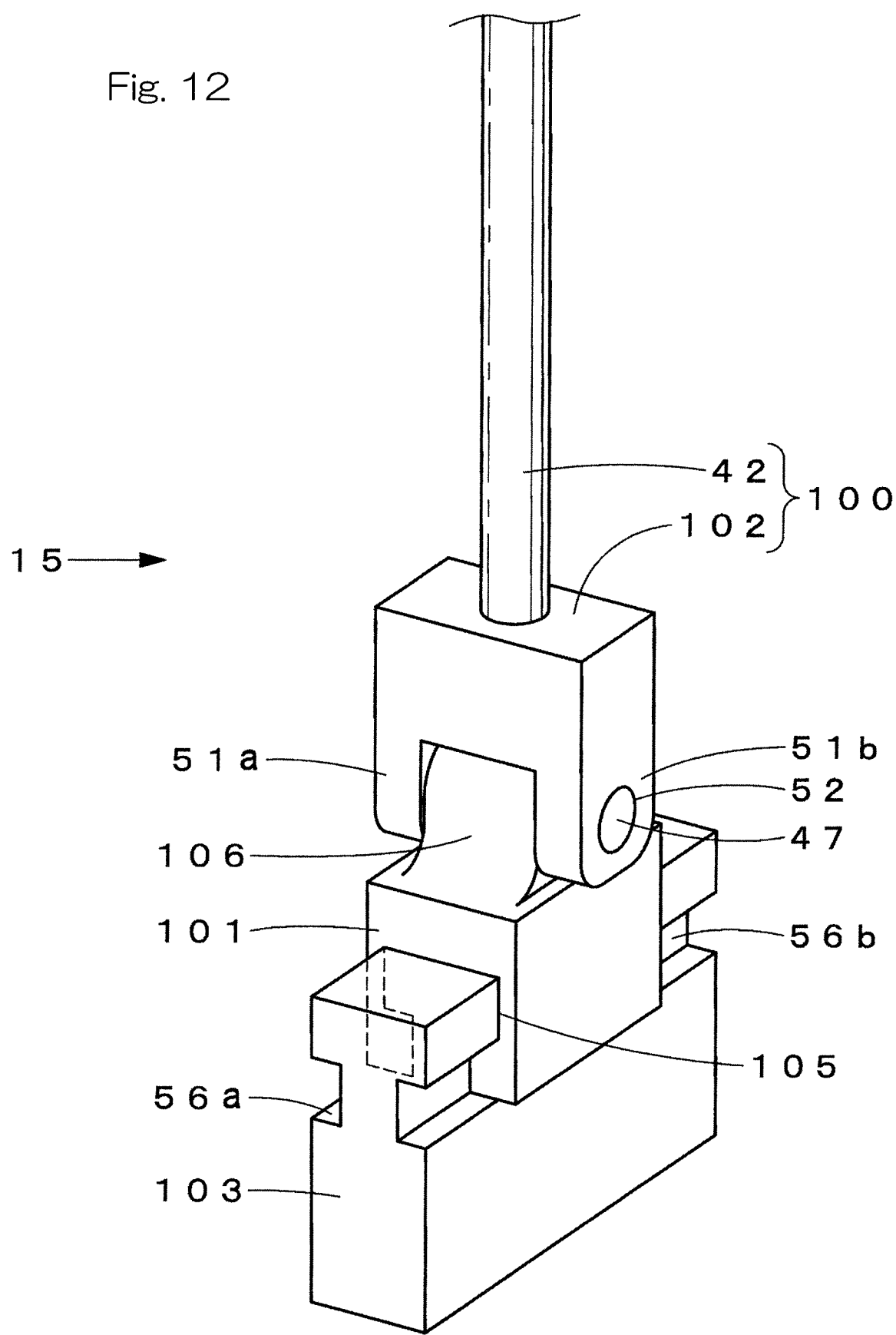
FIG. 12 is a fragmentary enlarged perspective view showing the undercut processing mechanism according to a fifth preferred embodiment of the present invention.

FIG. 12 is a fragmentary enlarged perspective view of the undercut processing mechanism 15 according to a fifth preferred embodiment of the present invention. Component parts similar to those employed in the molding die 1 according to the previously described first embodiment shown in and described with reference to FIGS. 1 to 6 are shown by like reference numerals and, therefore, the details thereof are not reiterated for the sake of brevity.

The undercut processing mechanism 15 according to the fifth embodiment has a basic structure similar to the undercut processing mechanism 11 for the molding die 1 of the previously described first embodiment of the present invention, but in place of the slide plates 45a and 45b, the slide rail 101 is employed and the number of the connecting pin 47 is one. Also, in correspondence therewith, the slide block 102 for the inclined pin 100 and the slide base 103 have respective shapes that are different from those of the undercut processing mechanism 11 for the molding die 1 according to the previously described first embodiment, but the basic shape and function remain the same.

The slide rail 101 is in the form of a block member having a dovetail groove 105 defined therein and is so formed as to be slidingly moved by the guide grooves 56a and 56b in engagement with an upper portion of the slide base 103 so formed as to represent a T-shape. Also, the slide rail 101 is formed with a connecting portion 106 so formed as to raise from an upper surface thereof, and the connecting portion 106 has a throughhole (not shown) defined in the raised portion for passage of the connecting pin 47 therethrough.

Figure 13:
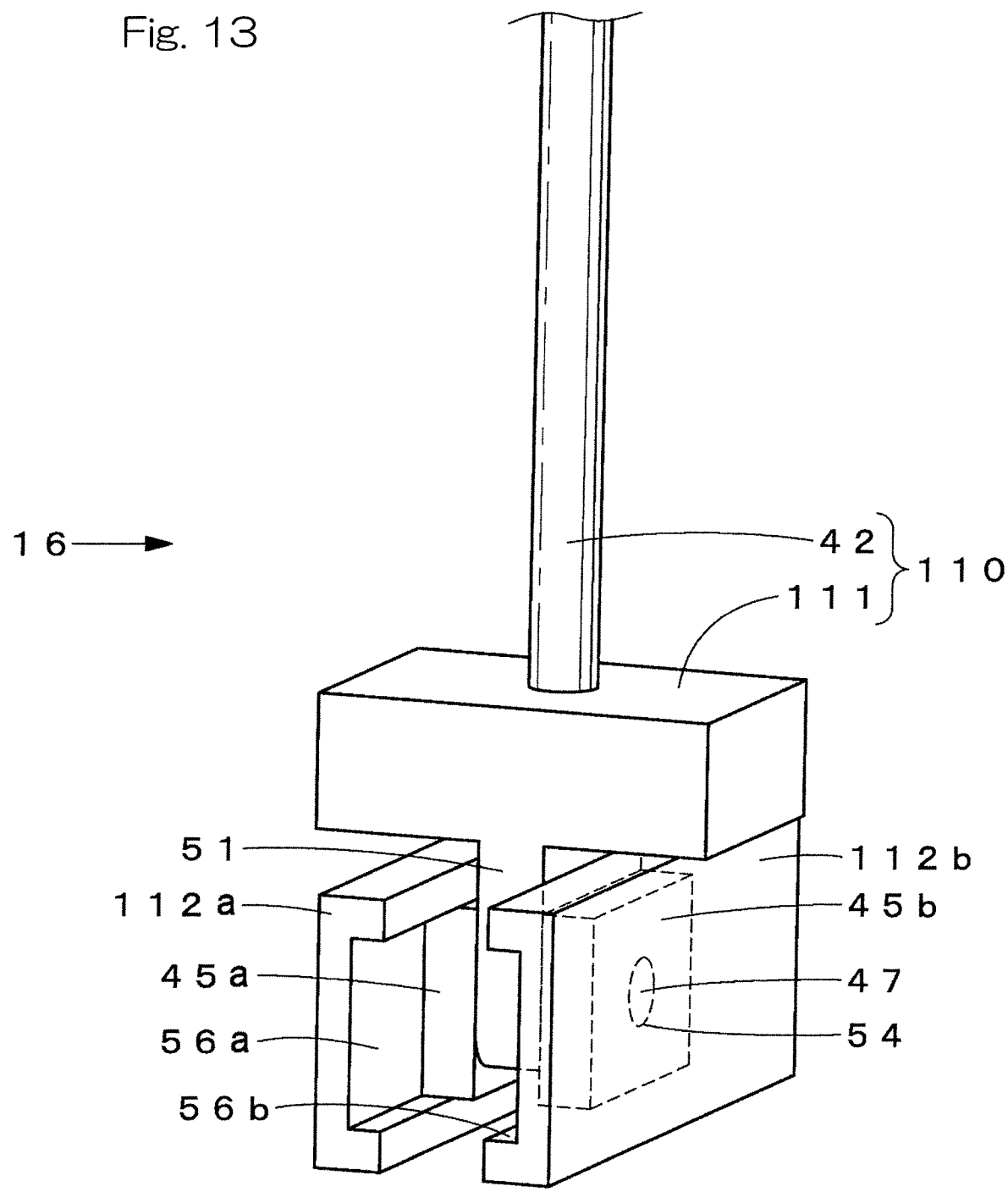
FIG. 13 is a fragmentary enlarged perspective view showing the undercut processing mechanism according to a sixth preferred embodiment of the present invention.

FIG. 13 is a fragmentary enlarged perspective view of the undercut processing mechanism 16 according to a sixth preferred embodiment of the present invention. Component parts similar to those employed in the molding die 1 according to the previously described first embodiment shown in and described with reference to FIGS. 1 to 6 are shown by like reference numerals and, therefore, the details thereof are not reiterated for the sake of brevity. The undercut processing mechanism 16 according to the sixth embodiment has a basic structure similar to the undercut processing mechanism 11 for the molding die 1 according to the previously described first embodiment, but the shape of the inclined pin 110, the shapes and numbers of the slide bases 112a and 112b are different from those in the undercut processing mechanism 11 for the molding die 1 according to the previously described first embodiment, and the number of the connecting pin 47 is one.

In the undercut processing mechanism 16 according to the sixth embodiment, only one projecting piece 51 is employed in the slide block 111 for the inclined pin 110 so as to protrude from a lower intermediate surface of the slide block 111, and the two slide bases 112a and 112b, representing a channel sectioned shape having the guide grooves 56a and 56b, are secured to the ejector plate 10 in face-to-face relation respectively with the guide grooves 56a and 56b.

As represented by the undercut processing mechanisms 15 and 16 according to the fifth and sixth embodiments, respectively, the structure of a sliding mechanism of the slide bases employed in the undercut processing mechanism of the present invention is not necessarily limited to the specific structure described and shown, but any suitable sliding mechanism may be employed.

Figure 14:
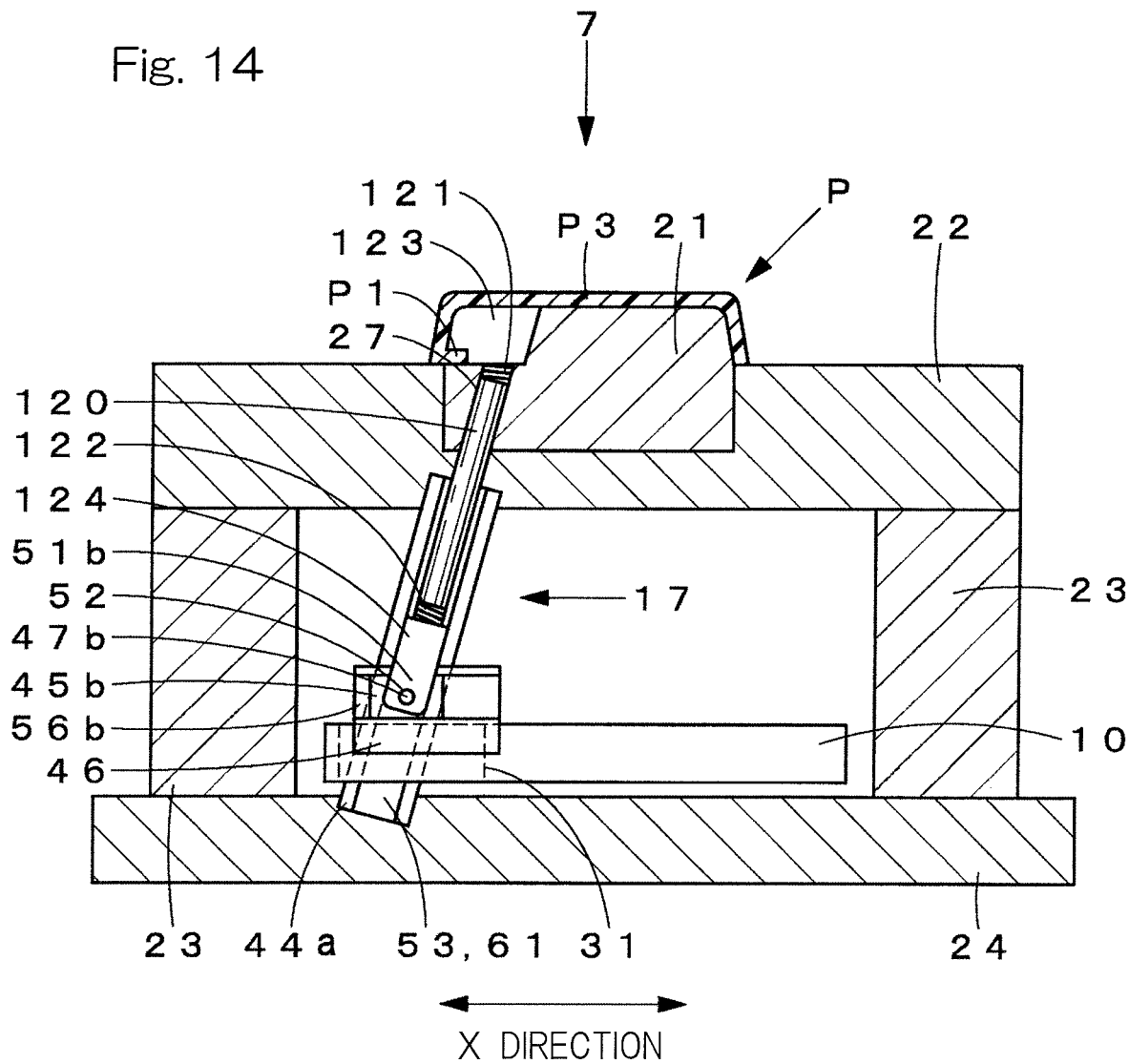
FIG. 14 is a longitudinal sectional view as viewed from front of the molding die in the practice of a seventh preferred embodiment of the present invention.

FIG. 14 is a longitudinal sectional view showing the molding die 7 according to a seventh preferred embodiment of the present invention as viewed from front. It is to be noted that in FIG. 14, the ejector plate 10 and the undercut processing mechanism 17 are shown in a front elevational view, with hatchings omitted. The molding die 7 according to the seventh embodiment, although the basic structure thereof is similar to that of the molding die 1 according to the previously described first embodiment, has the inclined pin 120 formed at its opposite ends with male screw threads 121 and 122 that are counter threaded to each other or right-hand and left-hand screw threads, and the bottom surface of the molding core 123 and the upper surface of the slide block 124 are formed with respective female screw threads (not shown) that are engageable respectively with the male screw threads 121 and 122.

According to the molding die 7 according to the seventh embodiment, by turning the inclined pin 120 around a longitudinal axis, the length of the whole of the molding core 123, the inclined pin 120 and the slide block 124 can be adjustable owing to the function of inverse screw.

A specific example of the slide portion (slide block) of the inclined pin and the shape of the guide section (guide rail), both employed in the undercut mechanism and the molding die according to the present invention will be described. FIGS. 15 to 33A and 33B illustrate first to twenty-fifth specific examples of the slide portion (slide lock) of the inclined pin and the shape of the guide section (guide rail) employed in the undercut processing mechanism of the present invention, which is as viewed from the same point of view in FIG. 5. It is to be noted that in a manner similar to FIG. 5, the slide surface is shown by the heavy line. Component parts similar to those of the molding dies 1 and 7 and the undercut processing mechanisms 11, 12, 13, 14, 15, 16 and 17 all employed in the practice of the first to seventh embodiments of the present invention shown in and described with reference to FIGS. 1 to 14, respectively, are shown by like reference numerals and the details thereof are not therefore reiterated for the sake of brevity.

Figure 15:
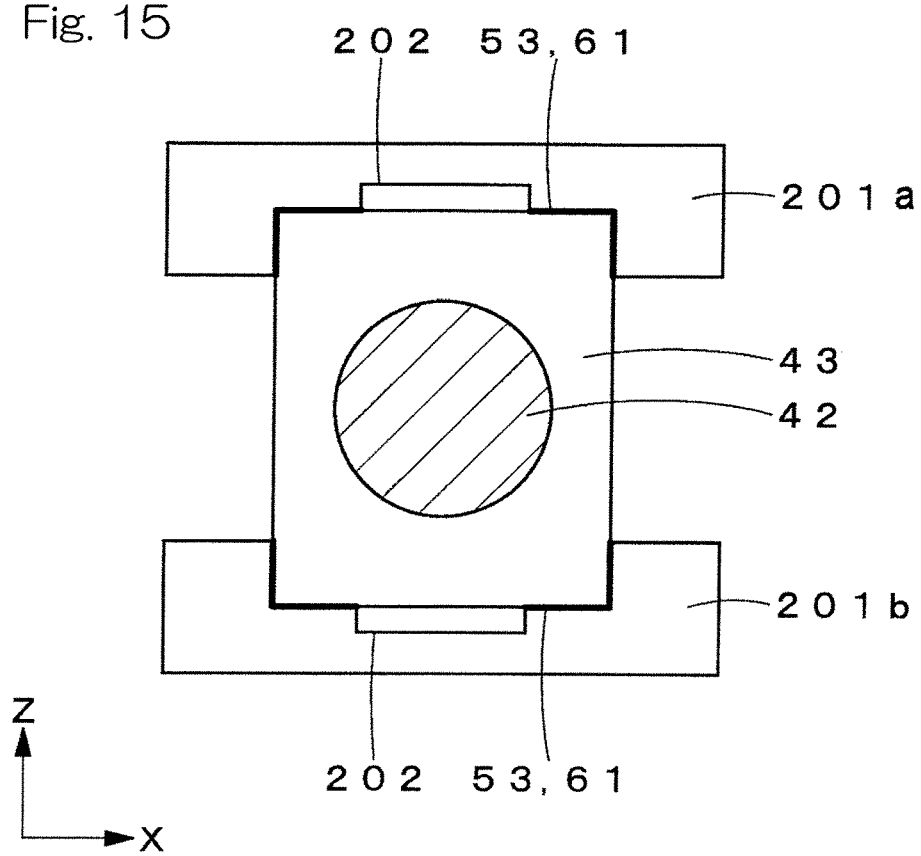
FIG. 15 is a diagram showing a first example of specific shapes of a slide portion (slide block) for the inclined pin and a guide section (guide rail) in the undercut processing mechanism of the present invention, both of which are viewed in a manner similar to that of FIG. 5.

The first example shown in FIG. 15 is such that, although it has a basic structure similar to the inclined pin 41 and the guide rails 44a and 44b both employed in the molding die 1 according to the previously described first embodiment of the present invention, a groove 202 is formed at an intermediate portion of the bottom surface 61 of the guide groove 53 in each of the guide rails 201a and 201b. Accordingly, the slide surface area between the slide block 43 and the guide rails 201a and 201b is reduced to lower the slide resistance and, therefore, a smooth slide can be accomplished between the slide block 43 and each of the guide rails 201a and 201b. Also, it contributes to reduction in weight. It is, however, to be noted that considering that the rattling movement taking place between the slide block and each of the guide rail is to be prevented, the larger the slide surface area, the better.

Figure 16:
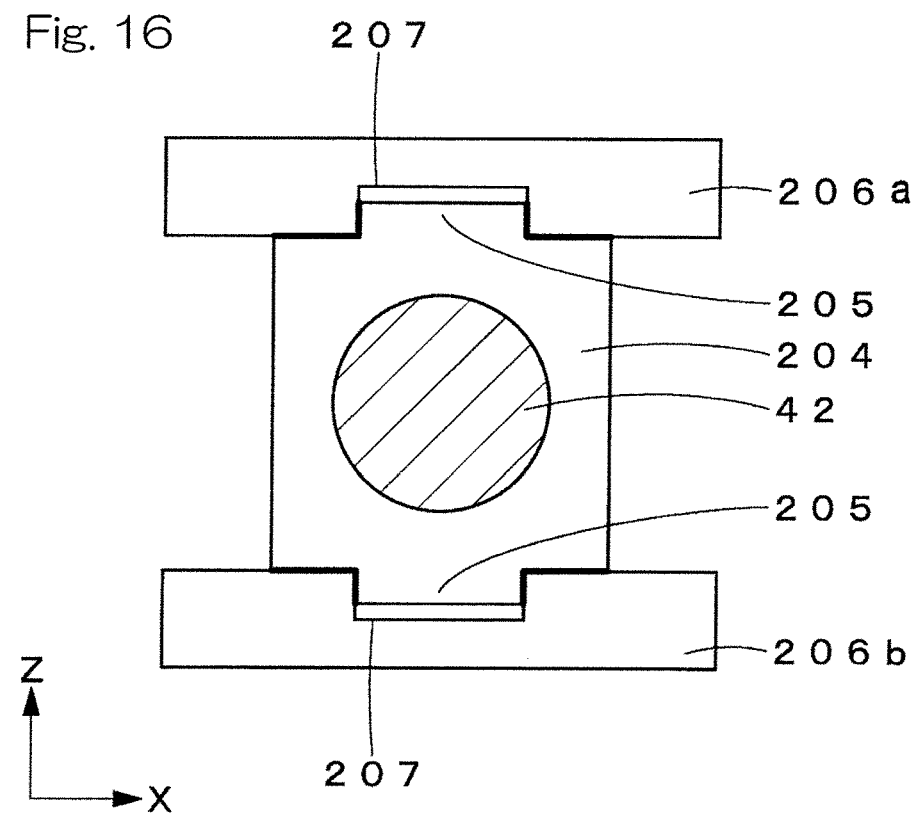
FIG. 16 is a diagram showing a second example of specific shapes of the slide portion (slide block) for the inclined pin and the guide section (guide rail) in the undercut processing mechanism of the present invention, both of which are viewed in a manner similar to that of FIG. 5.

The second example shown in FIG. 16 is such that, although it has a basic structure similar to the inclined pin 41 and the guide rails 44a and 44b both employed in the molding die 1 according to the previously described first embodiment of the present invention, a convexed portion 205 protruding from both side surfaces that faces in the Z direction is formed in the slide block 204 and a guide groove 207 in each of guide rails 206a and 206b is so formed deeper than the amount of projection of the convexed portion 205 while such guide groove 207 has a width that is the substantially same as that of the convexed portion 205. Accordingly, the side surfaces of each of the convexed portion 205 and the opposite side surfaces that faces to each other in the Z direction cooperate together to form a slide surface of the slide block 204, which slide the guide rails 206a and 206b.

Figure 17:
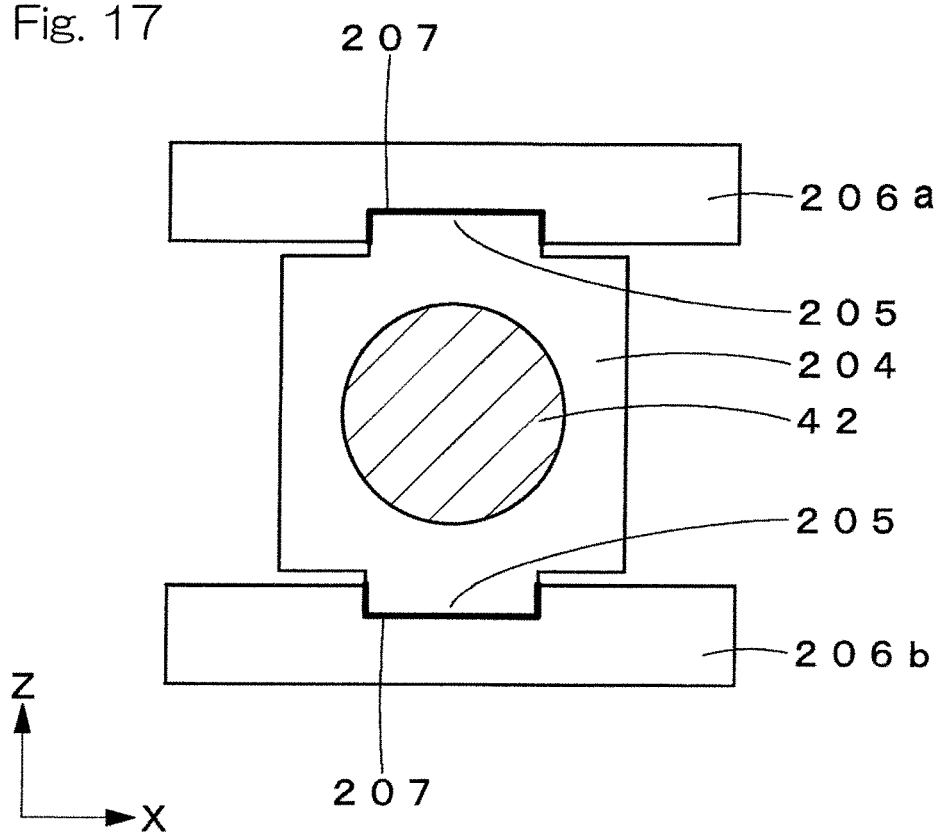
FIG. 17 is a diagram showing a third example of specific shapes of the slide portion (slide block) for the inclined pin and the guide section (guide rail) in the undercut processing mechanism of the present invention, both of which are viewed in a manner similar to that of FIG. 5.

The third example shown in FIG. 17 is such that, although it has a basic structure similar to the second example shown in and described with reference to FIG. 16, the side surfaces and projecting surface of the convexed portion 205 of the slide block 204 and the side surfaces and bottom surface of each of the guide rails 206a and 206b are so formed as to slide relative to each other.

Figure 18:
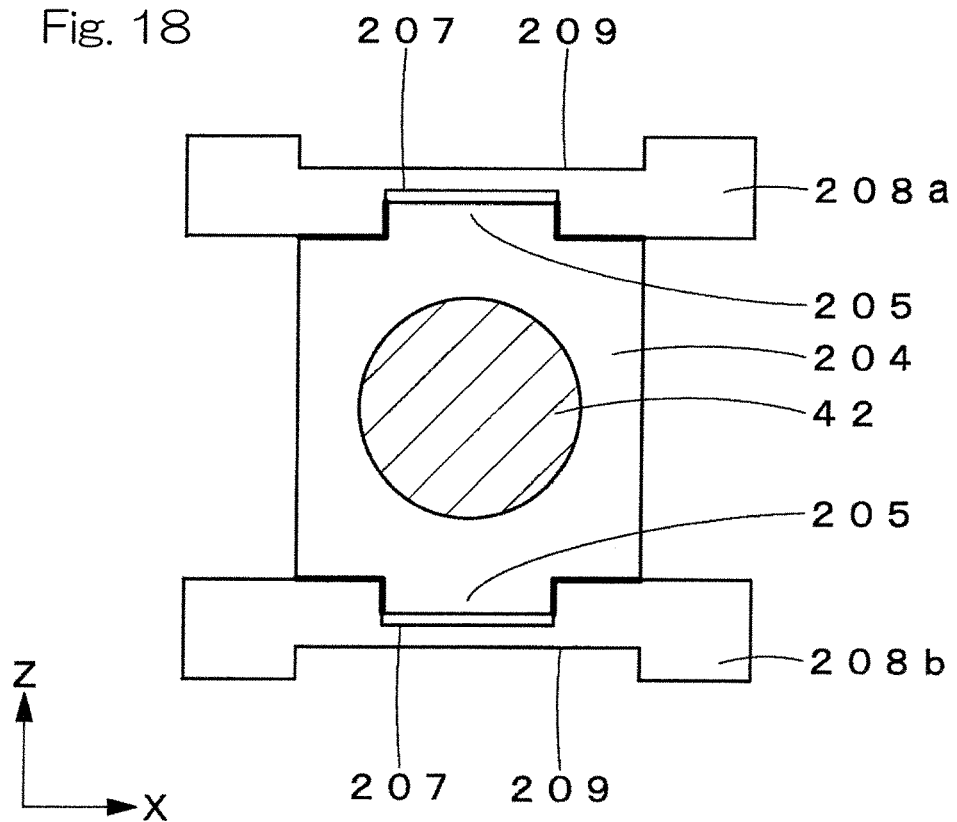
FIG. 18 is a diagram showing a fourth example of specific shapes of the slide portion (slide block) for the inclined pin and the guide section (guide rail) in the undercut processing mechanism of the present invention, both of which are viewed in a manner similar to that of FIG. 5.

The fourth example shown in FIG. 18 is such that, although it has a basic structure similar to the second example shown in and described with reference to FIG. 16, outer side surfaces of the guide rails 208a and 208b which face to each other in the Z direction are each formed with a respective lightening portion 209. According to the fourth example, reduction in weight can be accomplished while securing the bending rigidity.

Figure 19:
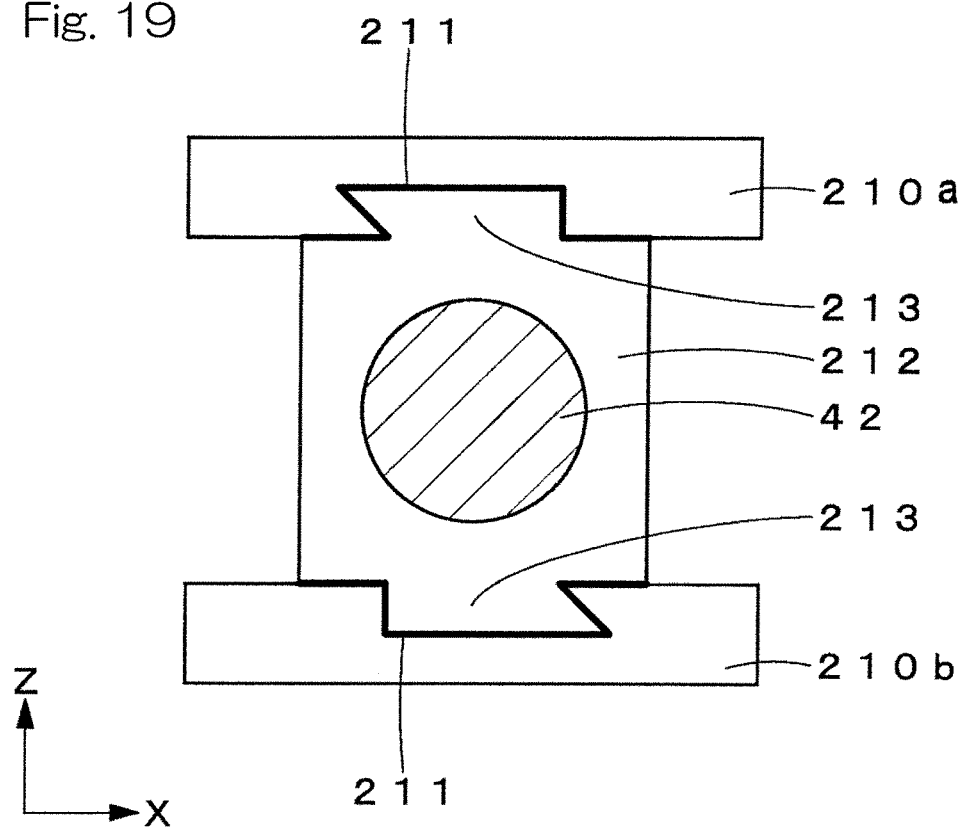
FIG. 19 is a diagram showing a fifth example of specific shapes of the slide portion (slide block) for the inclined pin and the guide section (guide rail) in the undercut processing mechanism of the present invention, both of which are viewed in a manner similar to that of FIG. 5.

The fifth example shown in FIG. 19 is such that, although it has a basic structure similar to the second example shown in and described with reference to FIG. 16, the guide rails 210a and 210b are so formed that only one of the side surfaces of a guide groove 211 is so formed as to have a dovetail shape of 45° in groove angle and, also, a convexed portion 213 of the slide block 212 is so formed as to be of a shape engageable with the guide groove 211. As is the case with the fifth example, it is possible to define the dovetail shape having the groove angle that is inclined in one side surface or the opposite side surface of the guide groove in the guide rail. It is to be noted that the groove angle of the dovetail groove is not necessarily limited to that particular angle discussed above.

Figure 20:
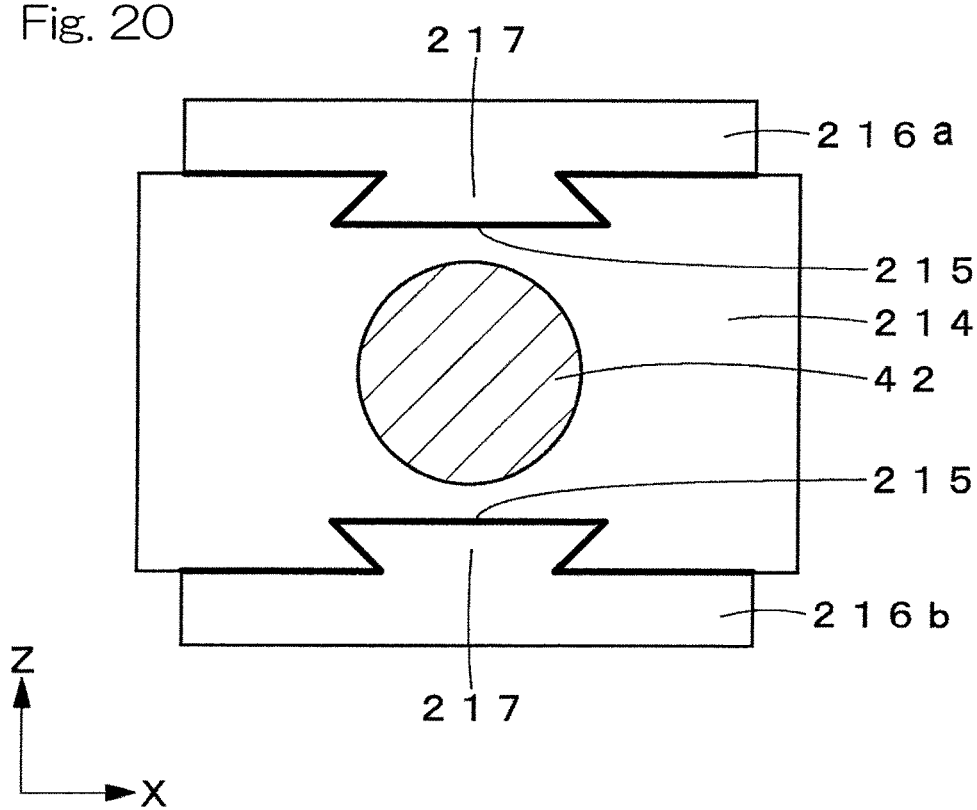
FIG. 20 is a diagram showing a sixth example of specific shapes of the slide portion (slide block) for the inclined pin and the guide section (guide rail) in the undercut processing mechanism of the present invention, both of which are viewed in a manner similar to that of FIG. 5.

The sixth example shown in FIG. 20 is such that a dovetail groove 215 of 45° in groove angle is formed in opposite surfaces of the slide block 214 that faces with each other in the Z direction and an element 27 of a shape complemental to the dovetail groove for engagement with the dovetail groove 215 is formed in the guide rails 216a and 216b. As is the case with the sixth example, a dovetail groove having a groove angle that is inclined may be formed in the slide block. Also, in the sixth example, although the slide block 214 is so formed as to have a width larger than that in any one of the previously discussed first to fifth examples, the width of the slide block 214 is not necessarily limited to that particular width.

Figure 21:
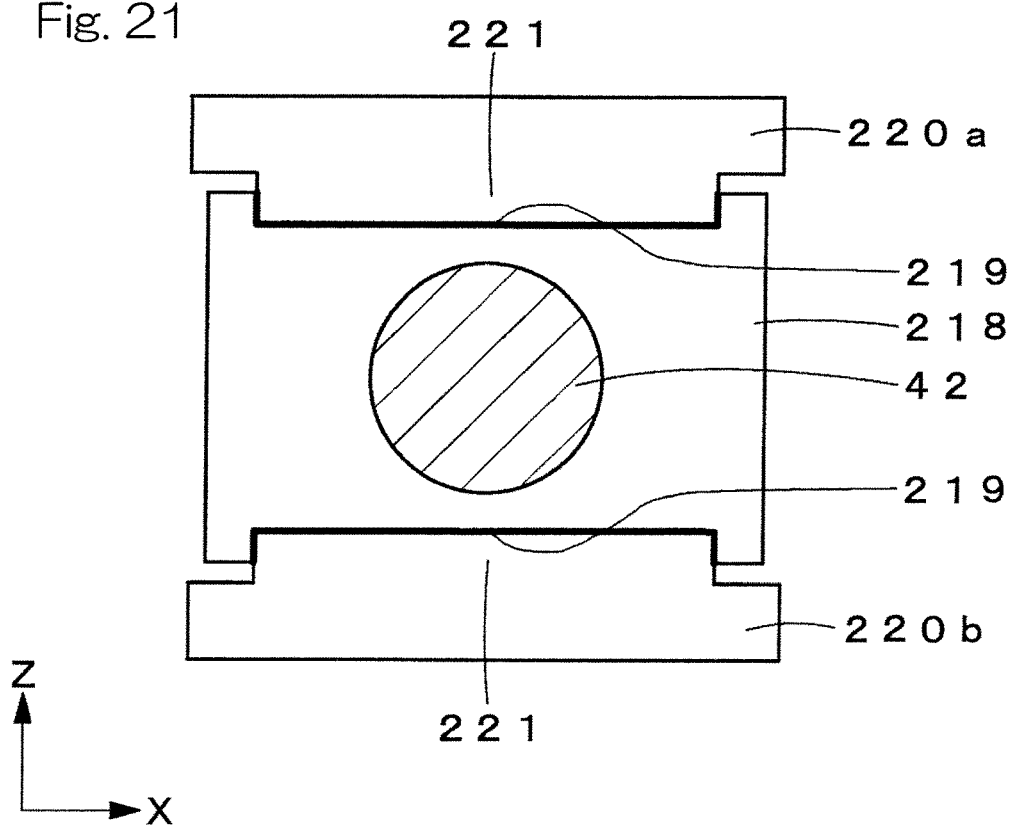
FIG. 21 is a diagram showing a seventh example of specific shapes of the slide portion (slide block) for the inclined pin and the guide section (guide rail) in the undercut processing mechanism of the present invention, both of which are viewed in a manner similar to that of FIG. 5.

In the seventh example shown in FIG. 21, the surfaces of the slide block 218 which face to each other in the Z direction are formed with a groove 219 of large width and the guide rails 220a and 220b are each formed with a convexed portion 221 of a shape engageable in the groove 219.

Figure 22:
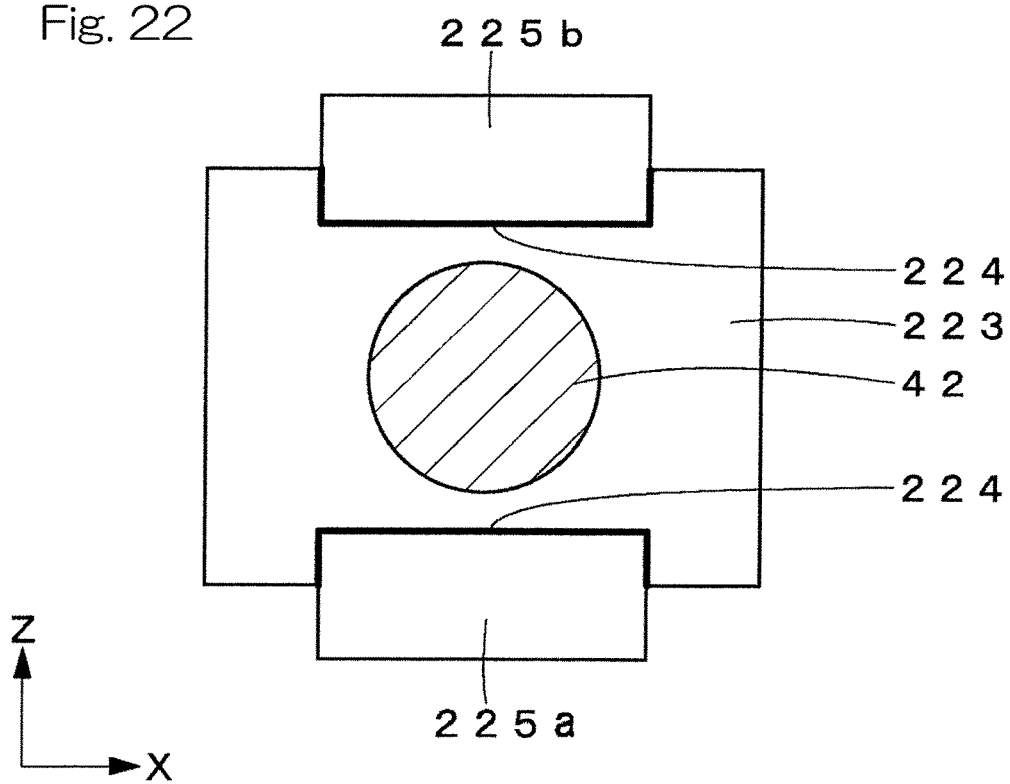
FIG. 22 is a diagram showing an eighth example of specific shapes of the slide portion (slide block) for the inclined pin and the guide section (guide rail) in the undercut processing mechanism of the present invention, both of which are viewed in a manner similar to that of FIG. 5.

In the eighth example shown in FIG. 22, the surfaces of the slide block 223 which face to each other in the Z direction are formed with an angled groove 224 and the guide rails 225a and 225b are each formed to be of a shape engageable in the angled groove 224. According to the eighth example, the guide rails 225a and 225b can be further compactized. In the eighth example, where the bending rigidity in the Z direction, for example, is desired to be increased, the width of the angled groove 224 and the width of the guide rails 225a and 225b in the X direction have to be increased.

Figure 23:
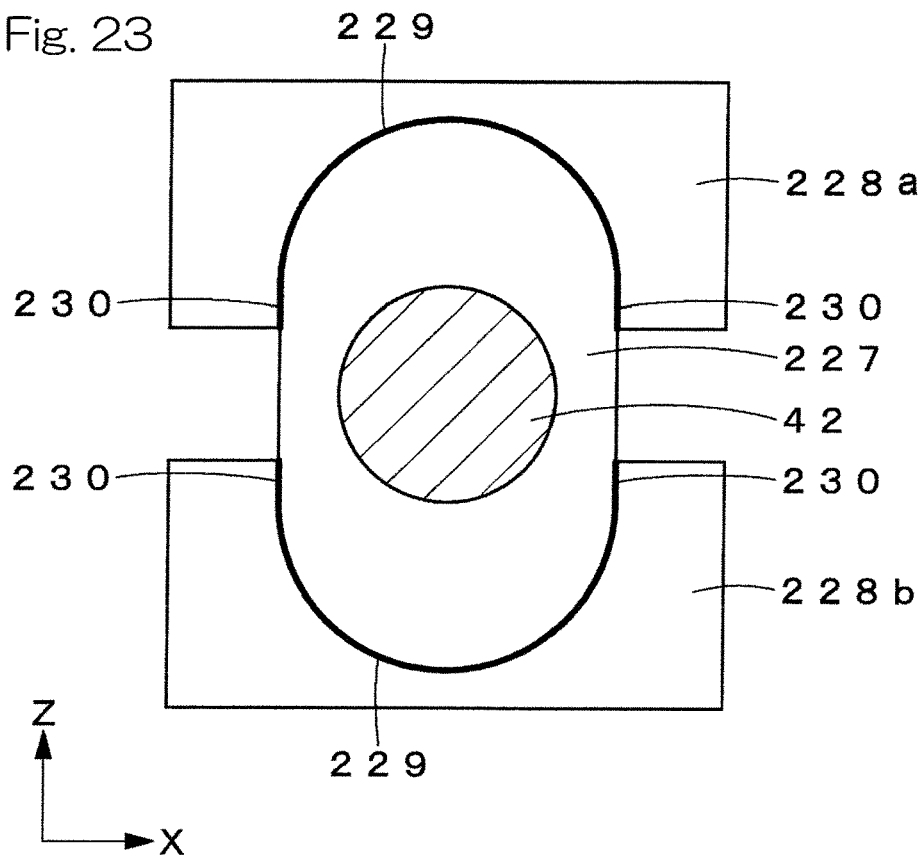
FIG. 23 is a diagram showing a ninth example of specific shapes of the slide portion (slide block) for the inclined pin and the guide section (guide rail) in the undercut processing mechanism of the present invention, both of which are viewed in a manner similar to that of FIG. 5.

The ninth example shown in FIG. 23 has a basic construction which is similar to the inclined pin 41 and the guide rails 44a and 44b both employed in the molding die 1 according to the previously described first embodiment of the present invention, but the slide block 227 and the guide rails 228a and 228b have their slide surfaces defined by a semicircular peripheral portion 229 and a flat surface portion 230.

Also, the tenth example shown in FIG. 24 has a basic structure which is similar to the ninth example shown in and described with reference to FIG. 23, but the slide block 232 and the guide rails 233a and 233b have their slide surfaces defined only by the semicircular peripheral portion 229.

Figure 25:
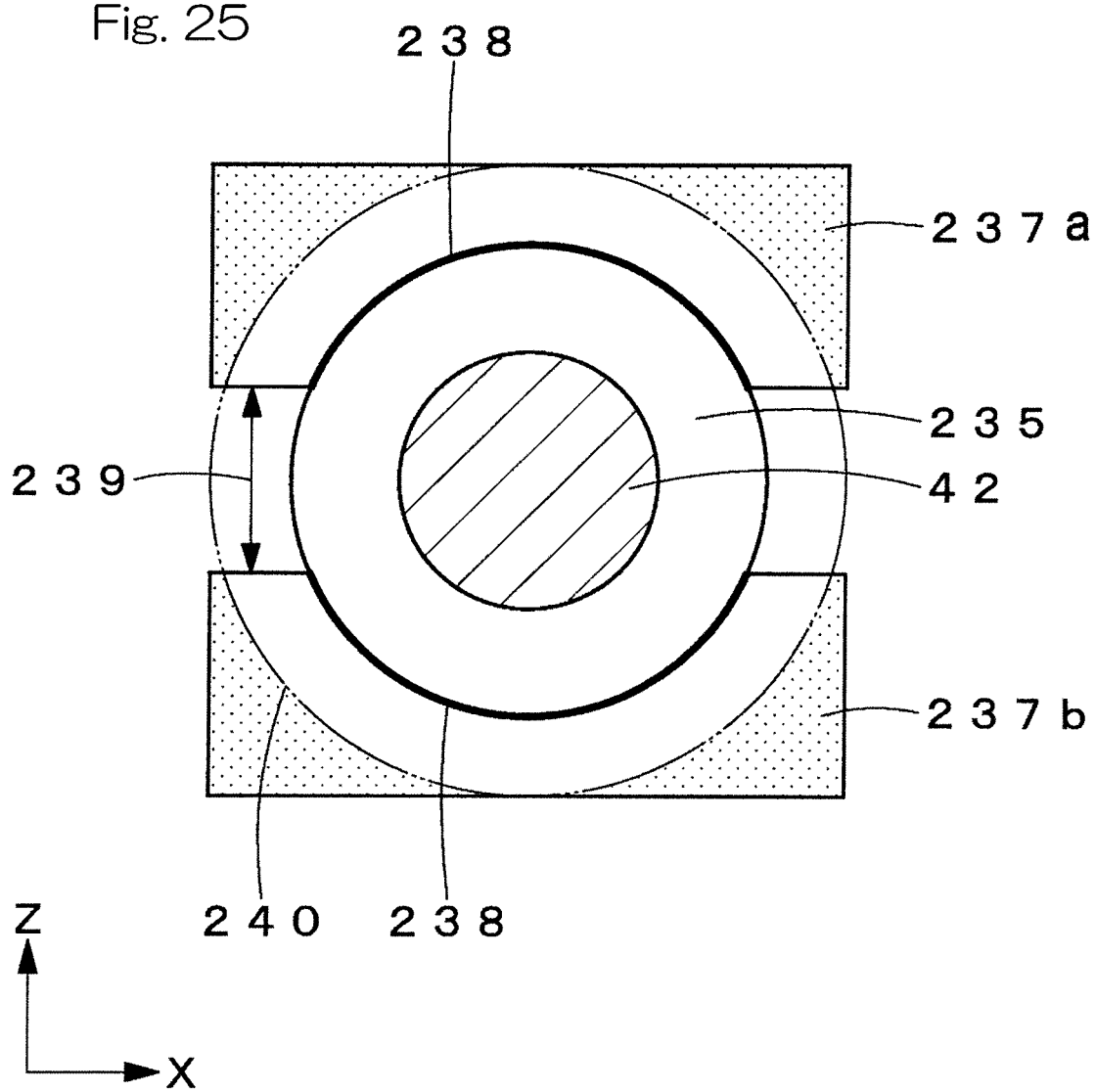
FIG. 25 is a diagram showing an eleventh example of specific shapes of the slide portion (slide block) for the inclined pin and the guide section (guide rail) in the undercut processing mechanism of the present invention, both of which are viewed in a manner similar to that of FIG. 5.

The eleventh example shown in FIG. 25 has a basic structure that is similar to the inclined pin 41 and the guide rails 44a and 44b both employed in the molding die 1 according to the previously described first embodiment of the present invention, but the slide block 235 represents a cylindrical shape and the guide groove 238 in the guide rails 237a and 237b is of a partially round surface shape and the slide surface is of a partially round surface shape.

Figure 24:
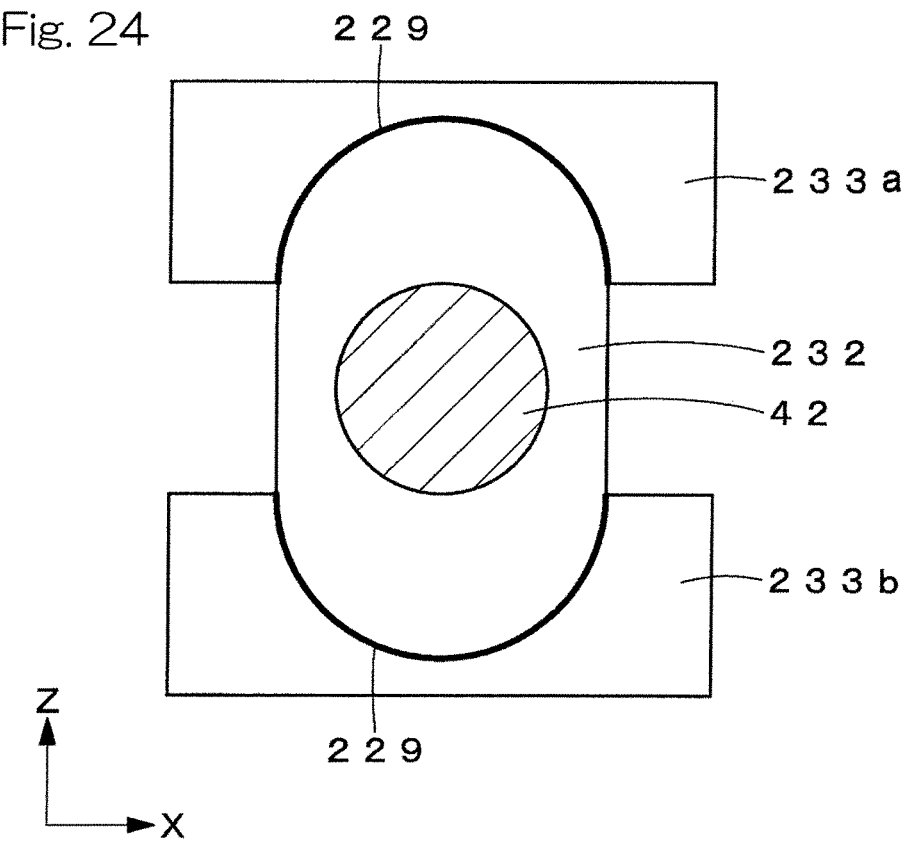
FIG. 24 is a diagram showing a tenth example of specific shapes of the slide portion (slide block) for the inclined pin and the guide section (guide rail) in the undercut processing mechanism of the present invention, both of which are viewed in a manner similar to that of FIG. 5.

As is the case with respective ninth to eleventh examples shown in FIGS. 23, 24 and 25, the slide surface of each of the slide block and the guide rail may be of a curved shape. It is, however, in order to increase the space between the guide rails and to avoid an undesirable dropout of the slide block from the guide rail, it is preferred to have at least a flat surface portion in a direction in which the expansion and the dropout are avoided.

Also, where as is the case with the eleventh example shown in FIG. 25, the slide block 235 is of a cylindrical shape and each of the guide rails 237a and 237b has a portion thereof representing a shape such as a square shape having a space 239 defined therein, relative to a guide member 240 (shown by the double dotted line) of a cylindrical shape (or a cylindrical shape having a slit defined in a portion thereof) with its diameter represented by the same length as the length of one side of the respective guide rail 237a and 237b, the bending rigidity in all direction can be increased by a quantity corresponding to the difference in sectional surface area between the cylindrical guide member 240 and the guide rails 237a, 237b that is shown by the dots in FIG. 25.

Figure 26A:
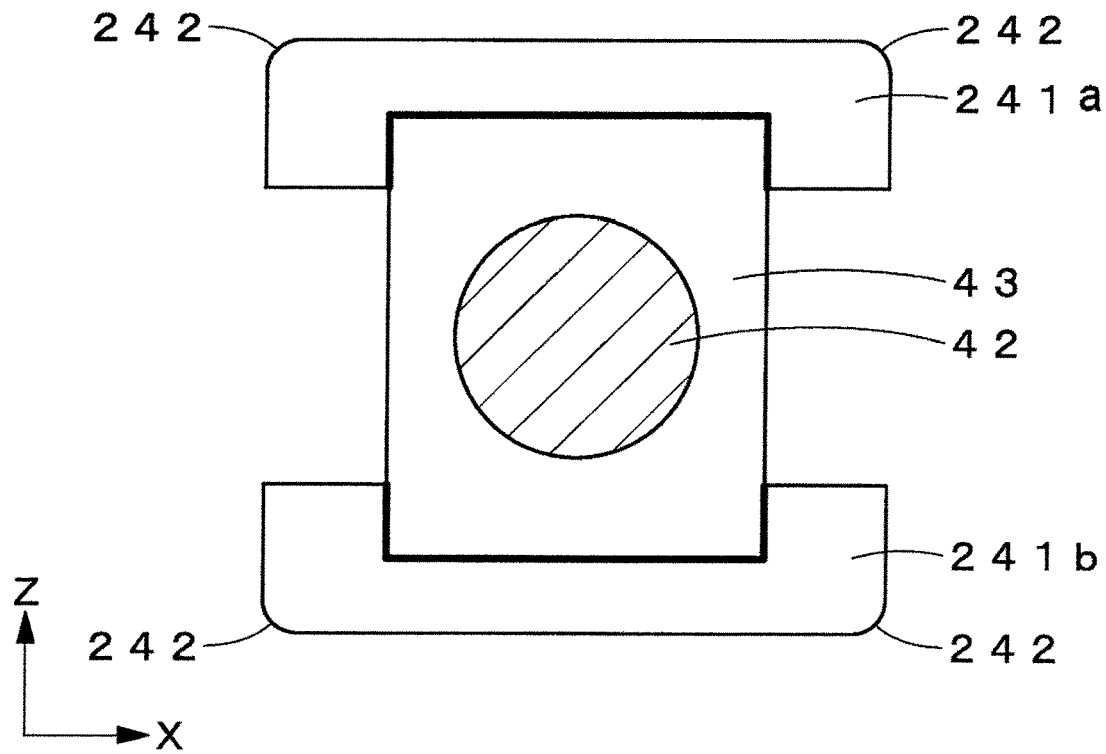
FIGS. 26A and 26B are diagrams showing twelfth and thirteenth examples of specific shapes of the slide portion (slide block) for the inclined pin and the guide section (guide rail) in the undercut processing mechanism of the present invention, both of which are viewed in a manner similar to that of FIG. 5.
Figure 26B:
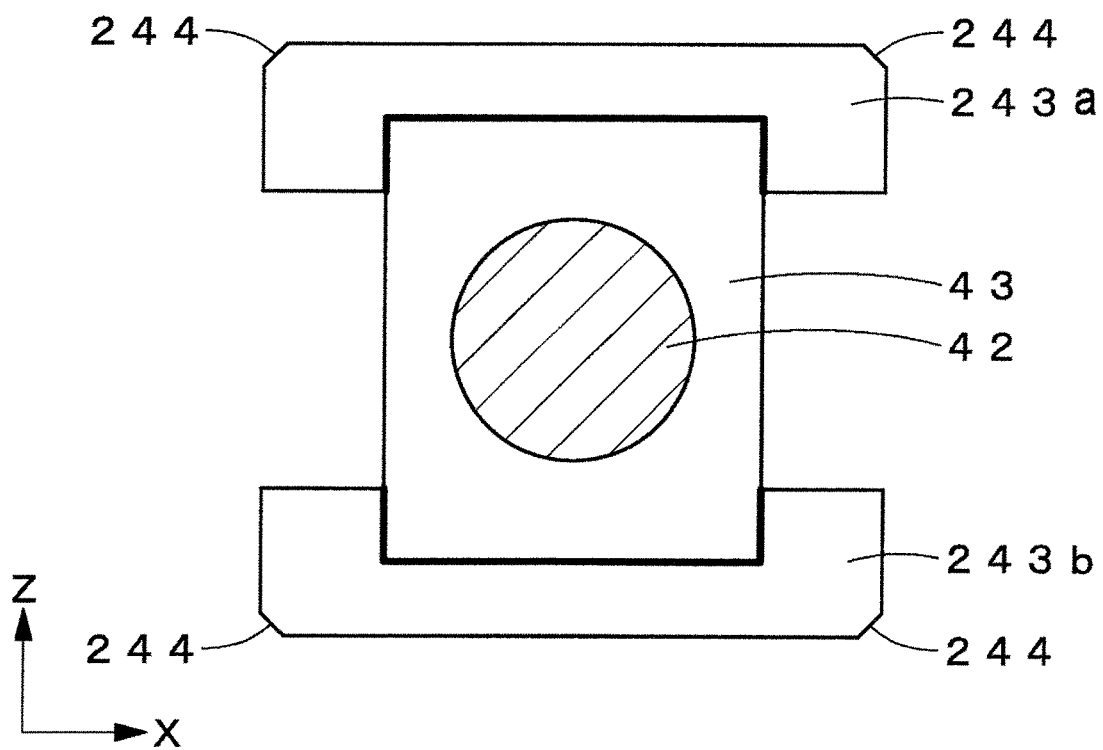

The twelfth example shown in FIG. 26A is such that although it has a basic structure which is similar to the inclined pin 41 and the guide rails 44a and 44b both employed in the molding die 1 according to the previously described first embodiment of the present invention, a corner portion 242 of each of the guide rails 241a and 241b is chamfered to represent a rounded shape. Also, in the thirteenth example shown in FIG. 26B, a corner portion 244 of each of the guide rails 243a and 243b is chamfered to represent a C-shape. As is the case with the twelfth and thirteenth examples discussed above, the slide block and the guide rails can be suitably chamfered.

Figure 27A:
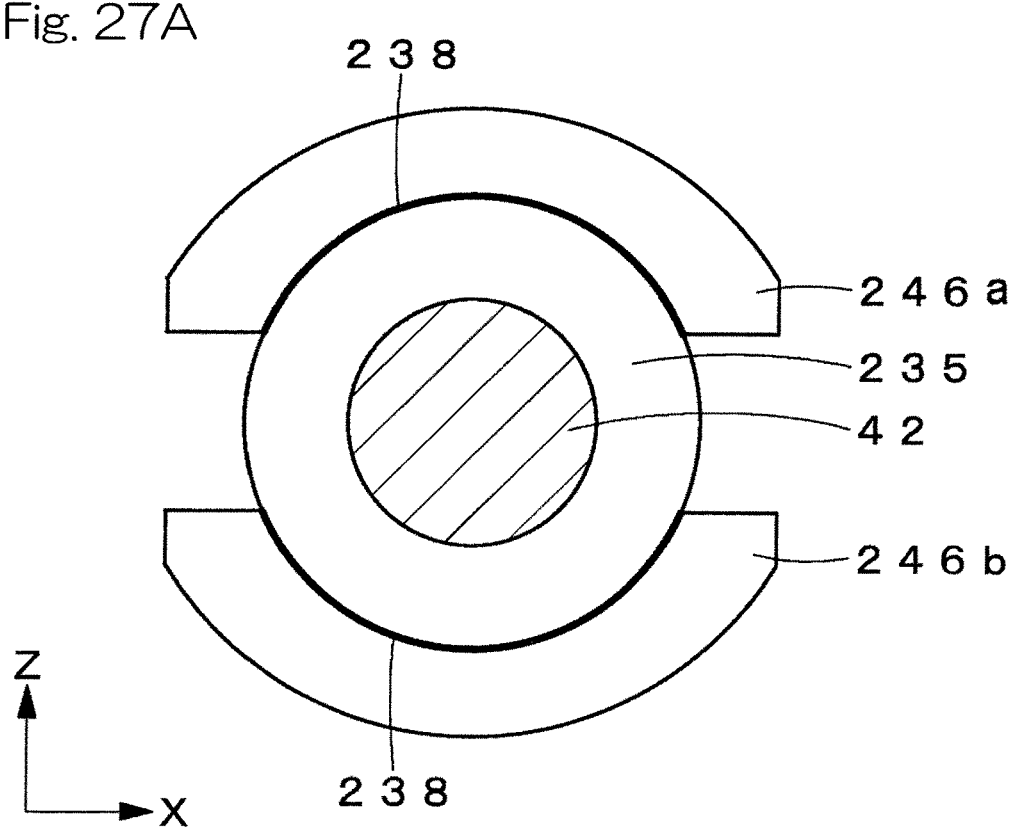
FIGS. 27A and 27B are diagrams showing fourteenth and fifteenth examples of specific shapes of the slide portion (slide block) and the guide section (guide rail) for the inclined pin in the undercut processing mechanism of the present invention, both of which are viewed in a manner similar to that of FIG. 5.
Figure 27B:
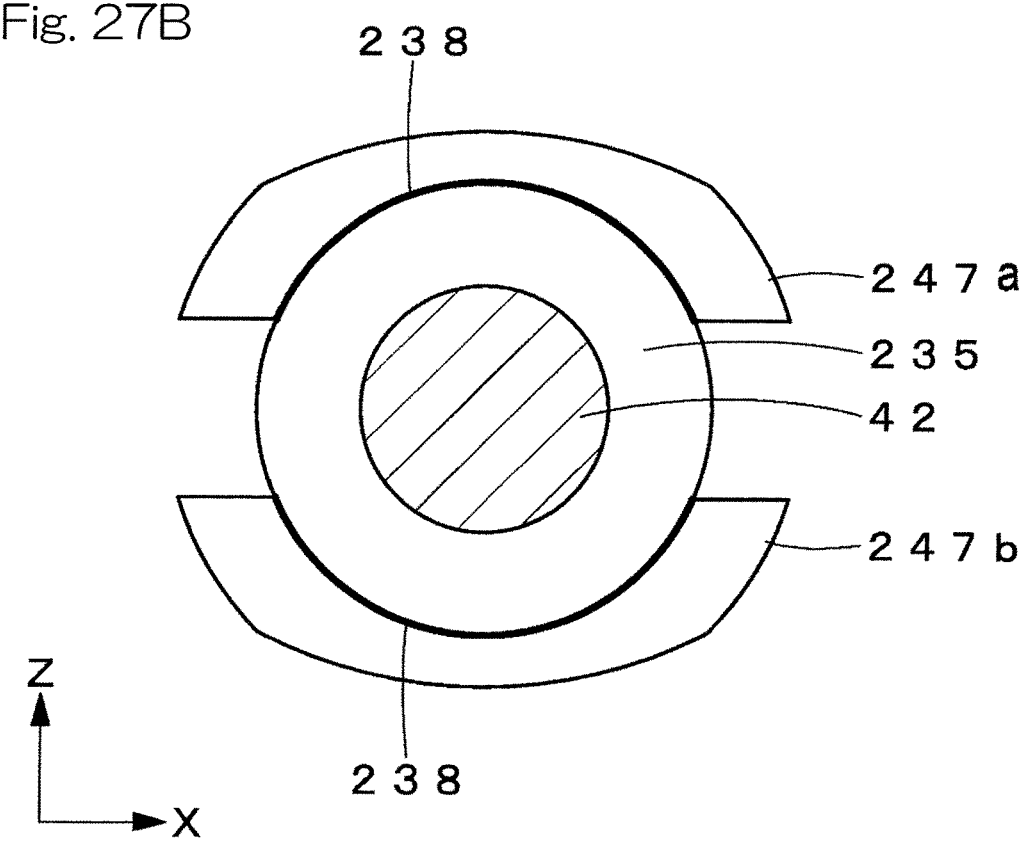

The fourteenth example shown in FIG. 27A, although having a basic structure that is similar to the eleventh example in FIG. 25, the opposed outer side surfaces of the guide rails 246a and 246b which face with each other in the Z direction are so formed as to represent a circular peripheral surface. Also, the fifteenth example shown in FIG. 27B, although having a basic structure that is similar to the eleventh example in FIG. 25, each of outer side surfaces of the guide rails 247a and 247b is formed by a plurality of circular surfaces of varying curvatures.

Figure 28A:
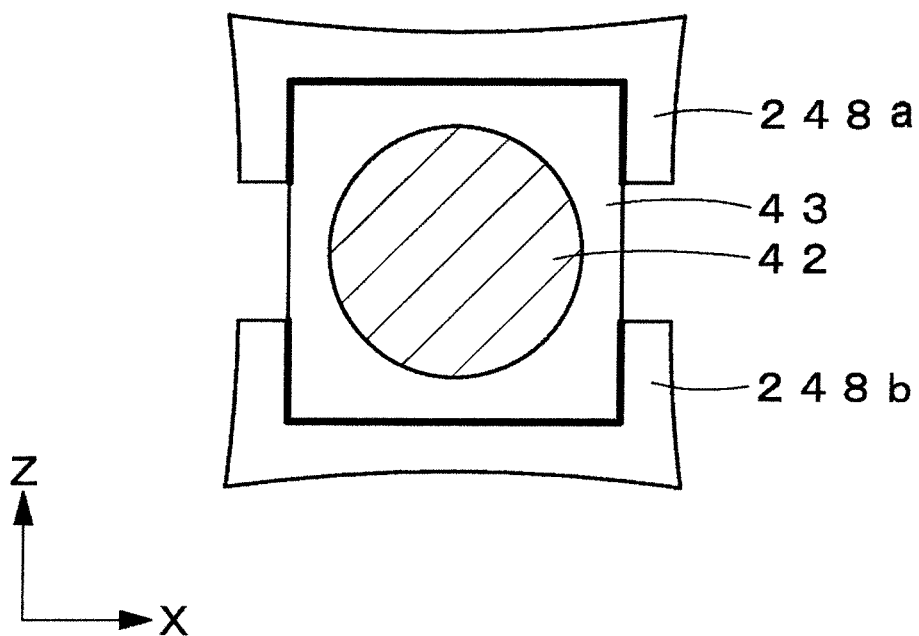
FIGS. 28A and 28B are diagrams showing sixteen and seventeenth examples of specific shapes of the slide portion (slide block) for the inclined pin and the guide section (guide rail) in the undercut processing mechanism of the present invention, both of which are viewed in a manner similar to that of FIG. 5.
Figure 28B:
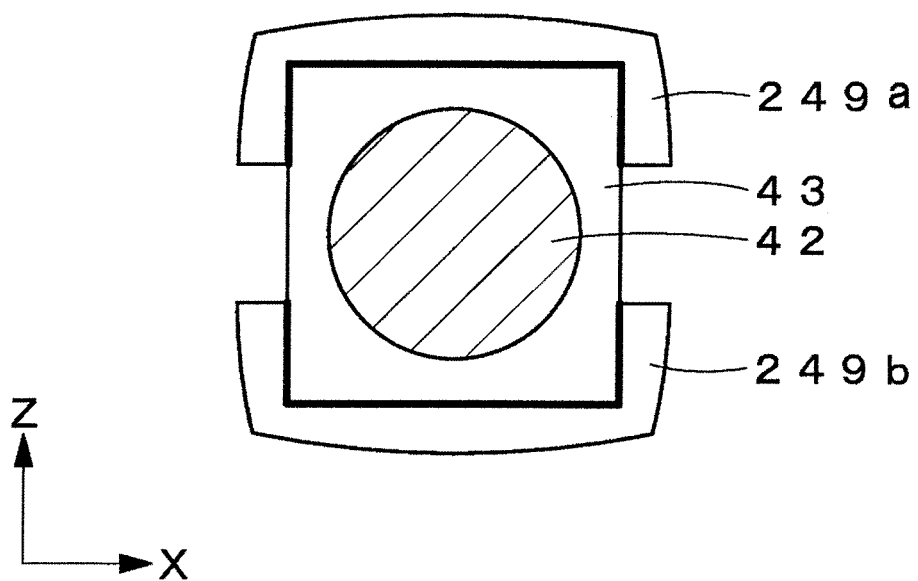

The sixteenth and seventeenth examples shown respectively in FIGS. 28A and 28B, although being of a basic structure that is similar to the inclined pin 41 and the guide rails 44a and 44b both employed in the molding die 1 according to the previously described first embodiment of the present invention, are such that the outer side surface of each of the guide rails 248a, 248b, 249a and 249b includes a plurality of circular peripheral surfaces of varying curvatures. As discussed with reference to FIGS. 27A and 27B and FIGS. 28A and 28B, the guide rail may have respective outer peripheral surfaces which may include a circular peripheral surface or a curved surface. It is to be noted that the outer peripheral surface of the guide rail may include a plurality of circular peripheral surfaces having the same curvature.

Figure 29A:
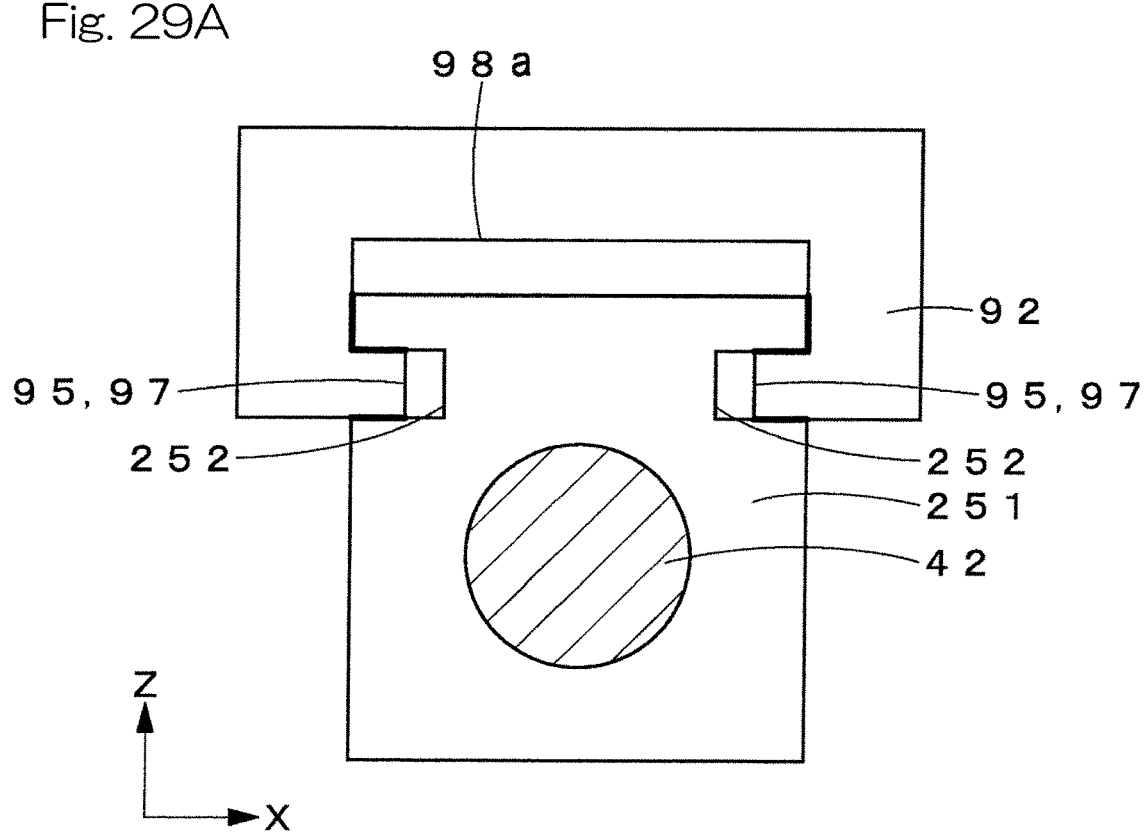
FIGS. 29A and 29B are diagrams showing eighteenth and nineteenth examples of specific shapes of the slide portion (slide block) for the inclined pin and the guide section (guide rail) in the undercut processing mechanism of the present invention, both of which are viewed in a manner similar to that of FIG. 5.

The eighteenth example shown in FIG. 29A is such that, although it has a basic structure which is similar to the inclined pin 90 and the guide rail 92 both employed in the undercut processing mechanism 14 according to the previously described fourth embodiment of the present invention, the slide block 251 is so formed that the slide block 251 will not slide in contact with the side surface 98a of the guide rail 92, which is opposed to the slide block 251, and the end surface 97 that defines the slit 95 of the guide rail 92, and has defined therein an engagement groove 252 for receiving an end portion that defines the slit 95 of the guide rail 92.

Figure 29B:
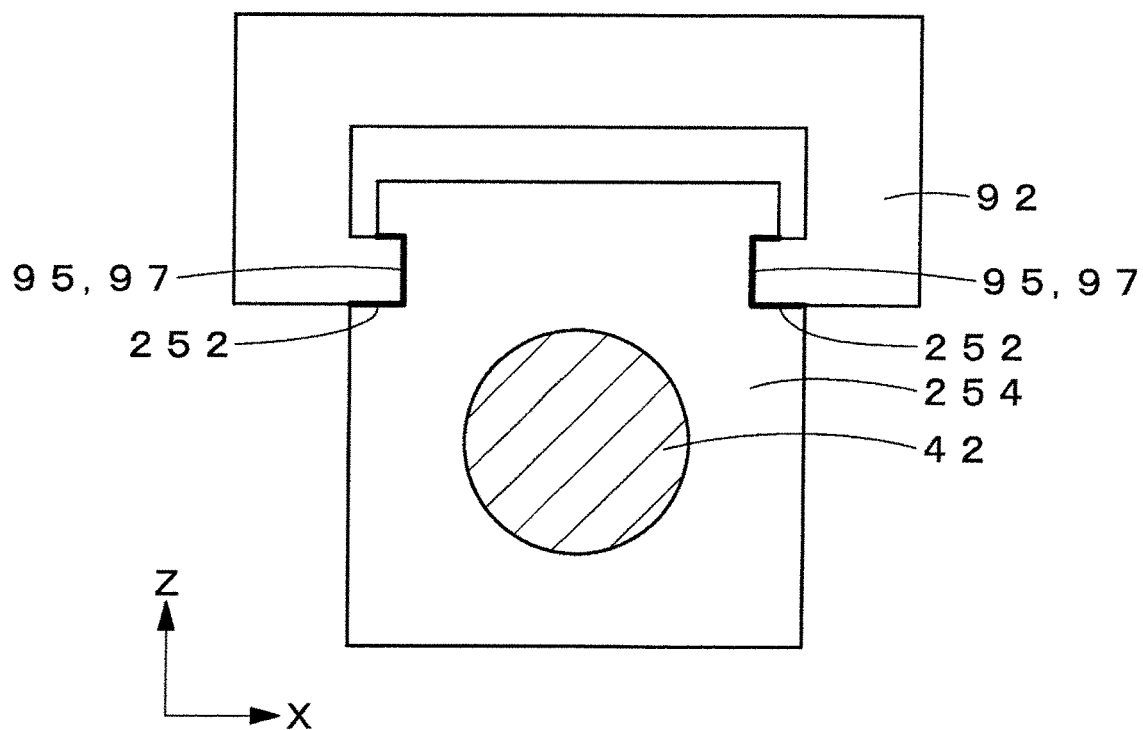

The nineteenth example shown in FIG. 29B is such that, although it has a basic structure which is similar to the eighteenth example shown in and described with reference to FIG. 29A, the slide block 254 is so formed as to be regulated in the X direction by the end surface 97 which forms the slit 95 of the guide rail 92. According to the respective eighteenth and nineteenth examples shown in FIGS. 29A and 29B, the slide surface area can be reduced to thereby lower the slide resistance while the rattling moment of the slide blocks 251 and 254 relative to the guide rails 92 is regulated.

Figure 30A:
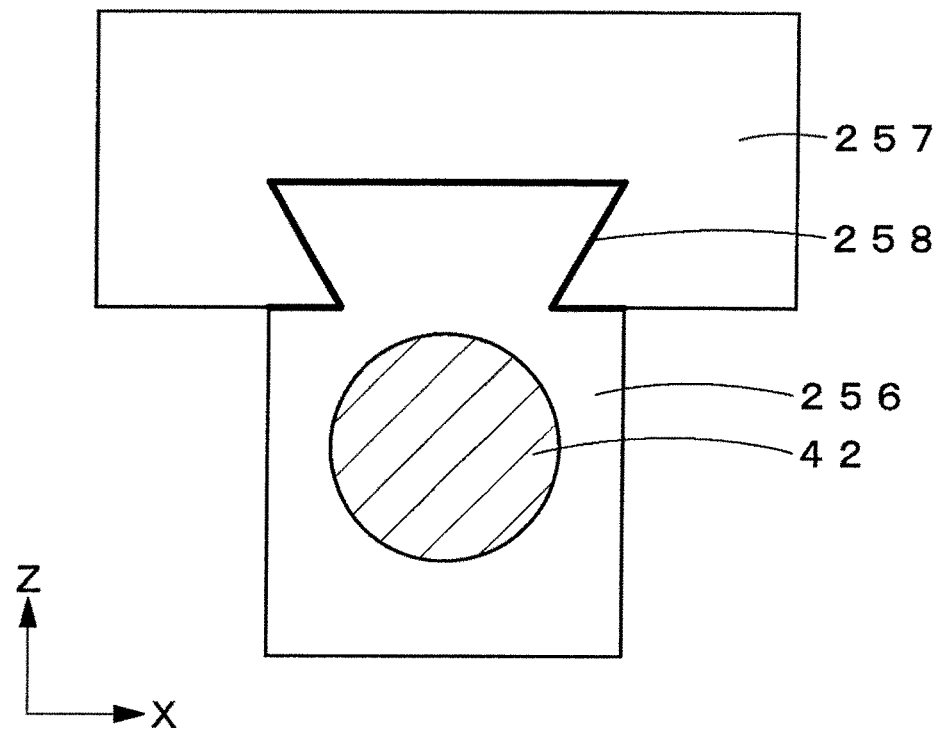
FIGS. 30A and 30B are diagrams showing twentieth and twenty-first examples of specific shapes of the slide portion (slide block) for the inclined pin and the guide section (guide rail) in the undercut processing mechanism of the present invention, both of which are viewed in a manner similar to that of FIG. 5.

The twentieth example shown in FIG. 30A is such that, although it has a basic structure which is similar to the inclined pin 90 and the guide rail 92 both employed in the undercut processing mechanism 14 according to the previously described fourth embodiment of the present invention, the slide block 256 and the guide rail 257 are so configured as to slide by means of the dovetail groove 258 having a groove angle of 45°. It is to be noted that the groove angle of the dovetail groove 258 is not necessarily limited to that particular angle.

Figure 30B:
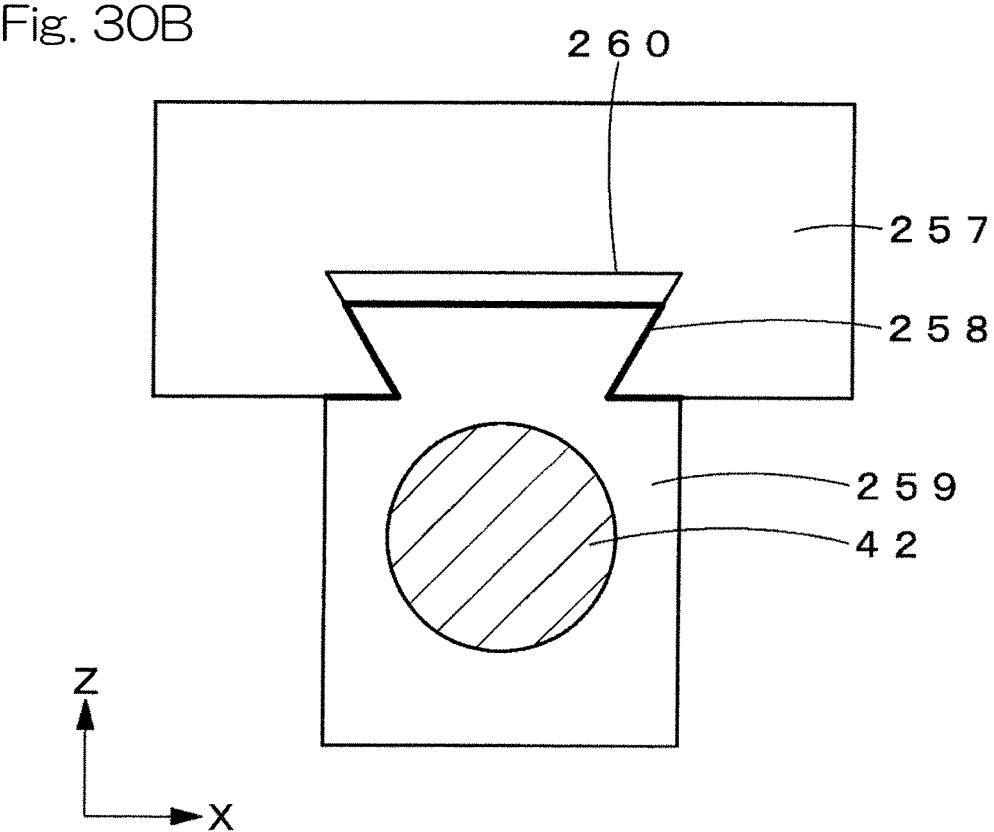

Also, the twenty-first example shown in FIG. 30B is such that, although the basic structure thereof is the same as the twentieth example shown in and described with reference to FIG. 30A, the slide block 259 is so configured that the slide block 259 will not slide with a surface 260 opposed to the guide rail 257. The respective twentieth and twenty-first examples shown in and described with reference to FIGS. 30A and 30B are such that processing of the dovetail groove in the guide rail 257 is easy to accomplish as compared with the undercut processing mechanism 14 according to the previously described fourth embodiment and is therefore suited for a mass producing shape.

Figure 31:
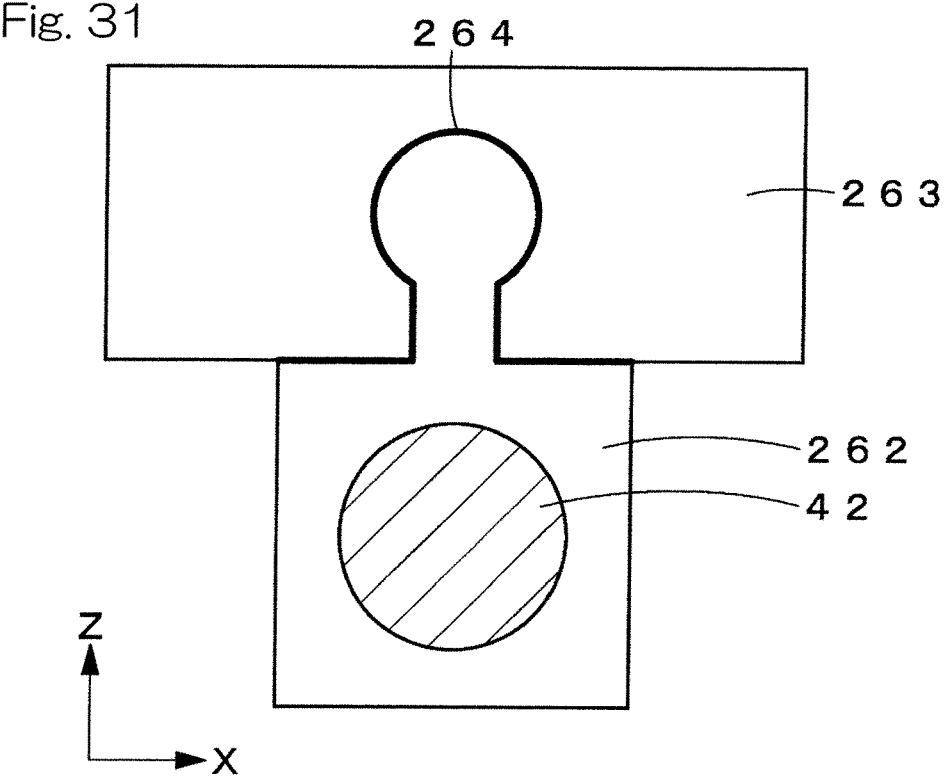
FIG. 31 is diagram showing a twenty-second example of specific shapes of the slide portion (slide block) for the inclined pin and the guide section (guide rail) in the undercut processing mechanism of the present invention, both of which are viewed in a manner similar to that of FIG. 5.

The twenty-second example shown in FIG. 31 is such that, although it has a basic structure which is similar to the inclined pin 90 and the guide rail 92 both employed in the undercut processing mechanism 14 according to the previously described fourth embodiment of the present invention, the slide block 262 and the guide rail 263 are so configured as to slide in engagement with a round dovetail groove 264. As can readily be seen from the twenty-second example, the shape of the dovetail groove for the slide block or the guide rail is not necessarily limited to that particular shape.

Figure 32:
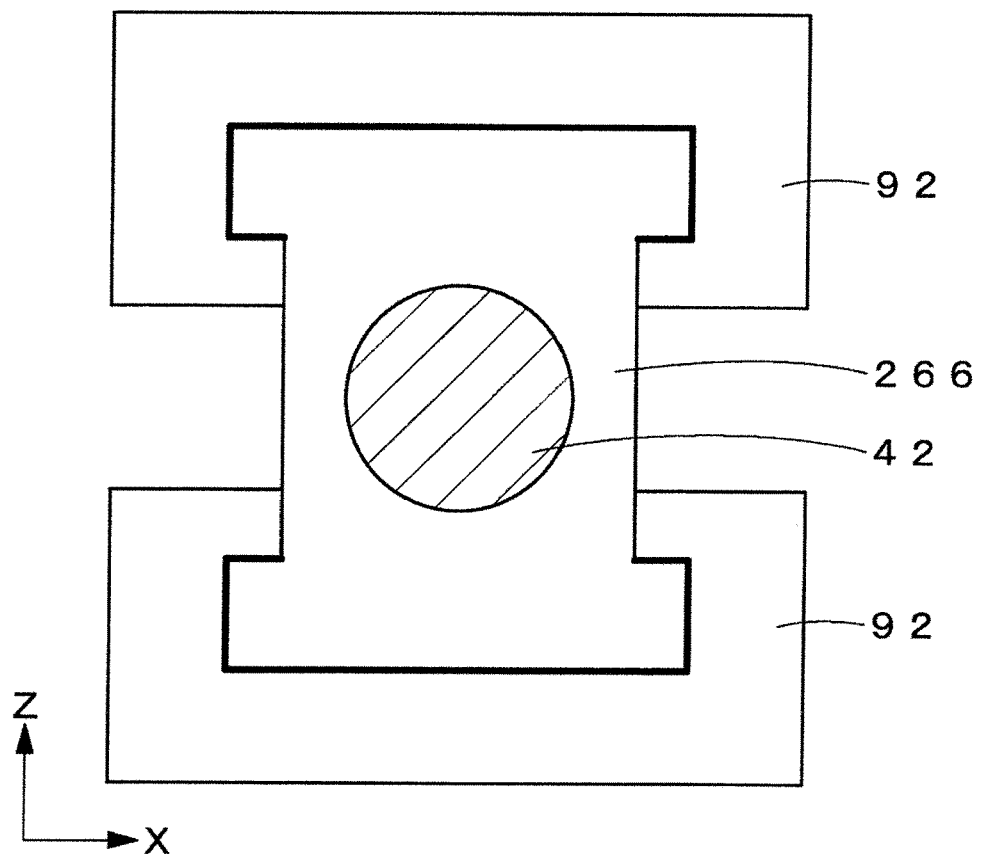
FIG. 32 is diagram showing a twenty-third example of specific shapes of the slide portion (slide block) for the inclined pin and the guide section (guide rail) in the undercut processing mechanism of the present invention, both of which are viewed in a manner similar to that of FIG. 5.

The twenty-third example shown in FIG. 32 is such that, although it has a basic structure that is similar to the inclined pin 90 and the guide rail 92 both employed in the undercut processing mechanism 14 according to the previously described fourth embodiment of the present invention, it is constructed with two guide rails 92 and the slide block 266 which slides in engagement with the two guide rails 92. Thus, as can readily be seen from the twenty-third example, it is possible to configure so that the slide may take place through the engagement between the two or more guide rails and the slide block.

Figure 33A:
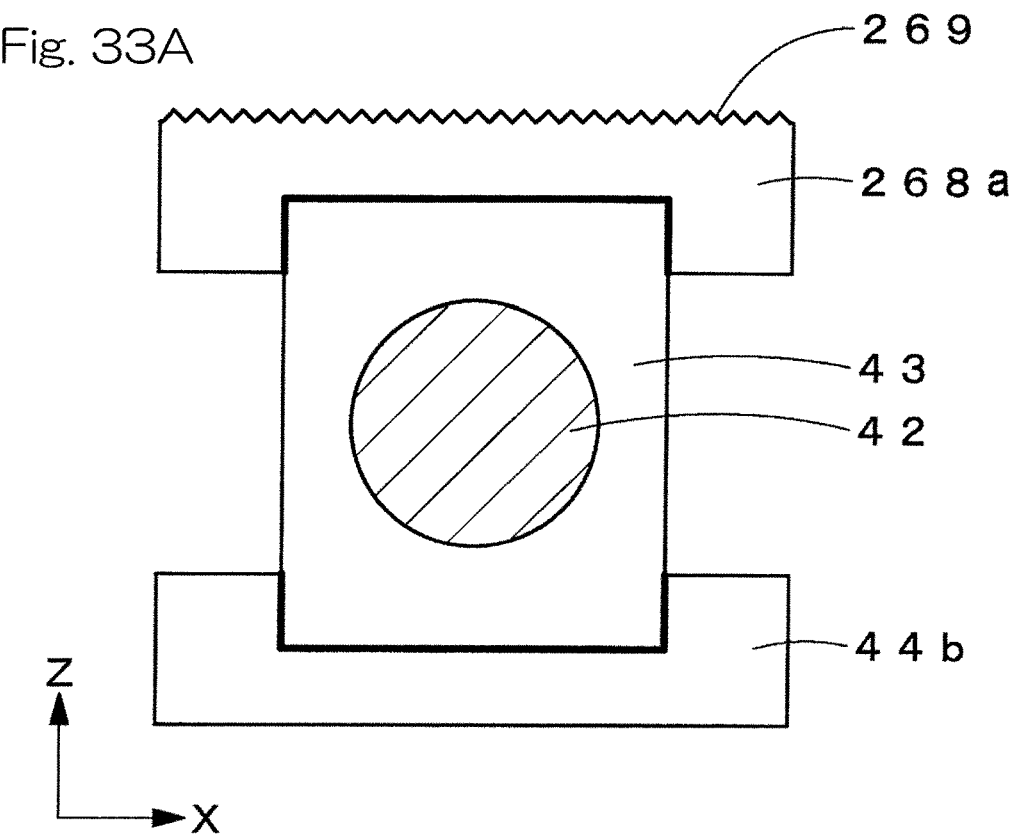
FIGS. 33A and 33B are diagrams showing twenty-fourth and twenty-fifth examples of specific shapes of the slide portion (slide block) for the inclined pin and the guide section (guide rail) in the undercut processing mechanism of the present invention, both of which are viewed in a manner similar to that of FIG. 5.
Figure 33B:
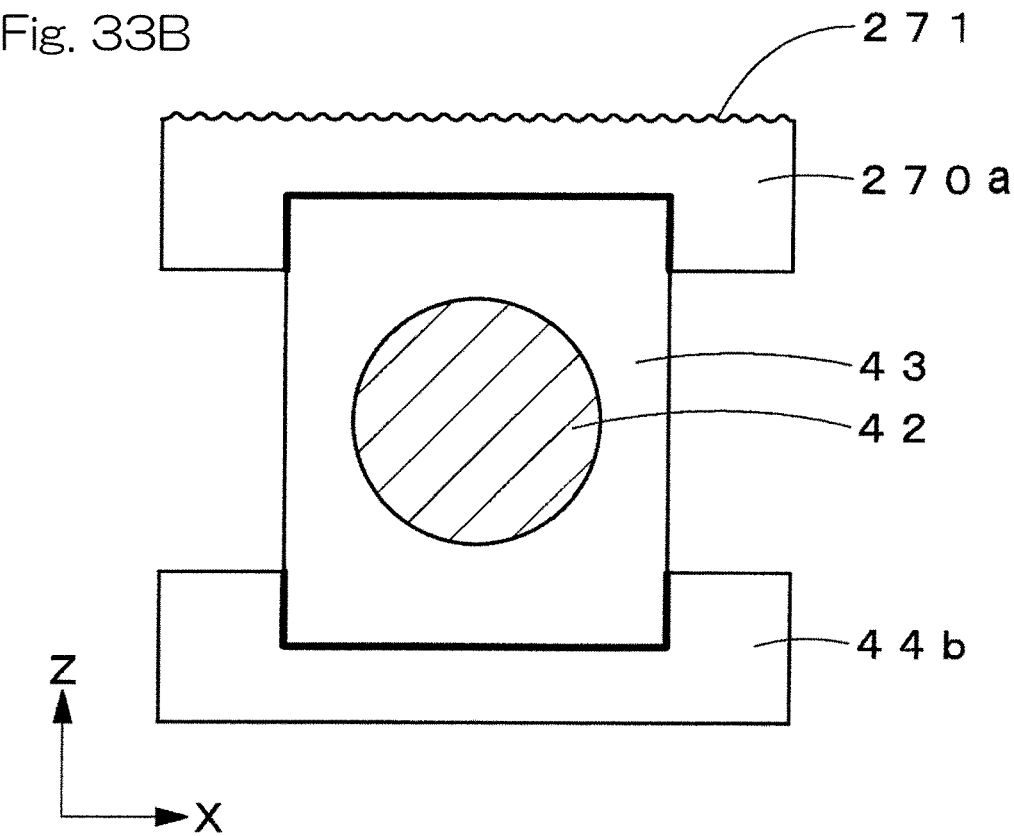

In the twenty-fourth example shown in FIG. 33A, although it has a basic structure similar to the inclined pin 41 and the guide rails 44a and 44b both employed in the molding die 1 according to the previously described first embodiment, the side surface 269 of one of the guide rails 268a, which lies perpendicular to the Z direction, is formed as a zigzag shaped wavy surface. Also, in the twenty-fifth example shown in FIG. 33B, the side surface 271 of one of the guide rails 270a, which lies perpendicular to the Z direction, is formed as a curve shaped wavy surface. As can readily be seen from the respective twenty-fourth and twenty-fifth examples shown in and described with reference to FIGS. 33A and 33B, a portion of or the whole of the guide rail 270a may be formed as a wavy surface.

While in the foregoing the undercut processing mechanism, the molding die and the molded product all according to the present invention have been described in connection with and with reference to the specific examples of the molding dies 1 and 7, the undercut processing mechanisms 11, 12, 13, 14, 15, 16 and 17 according to the first to seventh embodiments of the present invention, and shapes of the slide portions (slide blocks) and the guide section (guide rails) for the inclined pins shown in FIGS. 15 to 33A and 33B, the undercut processing mechanism, the molding die and the molded product all according to the present invention are not necessarily limited to those embodiments and those specific examples and, therefore, the present invention can be worked out without departing from the spirit and scope of the present invention. By way of example, a guide bushing (not shown) for guiding the pin main body 42 of the inclined pin 41 may be provided in the core 21 and/or the movable side template 22.

Also, in the undercut processing mechanism of the present invention, various side edges of the various members may be chamfered to provide a rounded feature or a C-shaped feature.

In addition, material for the members used in the undercut processing mechanism and the molding die both according to the present invention is not necessarily limited to a particular material and the same material as that used in any known undercut processing mechanism and molding dies can be suitably employed. It is, however, to be noted that the slide surfaces of the slide block, the guide rail, the slide plate, the slide rail and the slide base have to be made from or prepared from a material which has a good slidability or which has been surface treated to have a good slidability. It is also to be noted that each of those slide surfaces is not necessarily limited to that per surface and may be per line or per dot.

Yet, in the undercut processing mechanism according to the present invention, the slide plate or the slide rail may be non-rotatably connected with the slide block. It is, however, to be noted that where the load and bending moment both acting on the slide block and the guide rails are desired to be relieved, they are preferably rotatably connected. Also, the connecting pin is preferably disposed in the vicinity of the slide portion of the slide plate or the slide rail where the shear stress is desired to be dispersed.

Also, in the undercut processing mechanism according to the present invention, a portion or the whole of the molding core, the inclined pin (pin main body and slide block), the slide plate or the slide rail may be formed integrally. In addition, the guide rail may be integrally formed with the movable side template and/or the movable side mounting plate, and the slide base may be integrally formed with the ejector plate. To describe further, in place of the slide base, a guide groove for guiding the slide plate or the slide rail may be formed in the ejector plate.

The undercut processing mechanism according to the present invention may not be necessarily limited to the use as a so-called loose core, but can be adapted to the so-called slide core, the cavity slide or the like.

Also, the undercut processing mechanism according to the present invention may not be necessarily limited to application to the molding die which open and close in a vertical direction, but may be applied to the molding die which open and close in a horizontal direction or any other direction. Where the undercut processing mechanism according to the present invention is to be installed in the molding die at an angle approximate to the horizon, so that a sufficient bending rigidity against the direction of the gravitational force, the shape of the guide rail is desired to be determined.

In the undercut processing mechanism according to the present invention the guide section (guide section) is so shaped as to contact the slide portion over an entire stroke of the inclined pin, and is also so formed as to have the shape of a kind in which the bending rigidity in a particular direction in the slide portion (slide block) is high. The particular direction referred to above basically means a direction in which the load and the bending moment concentrate in the slide portion, for example, the direction of movement of the molding die and the slide plate or the direction of gravitational force, but it is not necessarily limited to that direction and, depending on the construction, the direction in which the bending rigidity is desired to be increased may be suitably chosen.

Also, since the bending rigidity is proportional to the moment of inertia of area and, basically, the width (length) of the bending direction in section and the distance in a direction perpendicular to the bending direction from the center of the bending moment to the sectional center of gravity affects the moment of inertia of area considerably. Accordingly, where the bending rigidity in the desired particular direction is to be increased, the shape of the guide rail (and the slide block) may be determined so that the width (length) in such particular direction in the cross section and the distance perpendicular to the bending direction from the center of the bending moment to the center of gravity may become large.

It is to be noted that, in the undercut processing mechanism and the molding die according to the present invention, the inclined pin is an inclined pin having a slide portion which is so disposed as to slide in a first direction inclined to a direction required to open a mold of the molding die or die opening direction, during the removal of the molded article having the undercut portion defined therein, to thereby remove the undercut portion. The inclined pin is to be understood as including an inclined pin in general, which is fitted to and slide together with, for example, a fixed side template and/or a movable side template of the molding die for forming the undercut portion, such as, for example, an inclined pin or the like.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. An undercut processing mechanism which is fitted to a molding die for forming a molded product having an undercut portion and which includes a molding core for forming the undercut portion, the undercut processing mechanism comprising:
    an inclined pin movable in a first direction inclined relative to a die opening direction of the molding die at the time of removal of the molded product from the die, to allow the removal of the molding core from the undercut portion; and
    a guide section configured to guide the movement of the inclined pin,
    wherein:
    the inclined pin has a slide portion slidable in contact with the guide section;
    the guide section is so shaped as to contact the slide portion over an entire stroke of the inclined pin so that the first direction of movement of the inclined pin can be regulated, is so shaped as to have a bending rigidity higher in a particular direction of the slide portion compared to a bending rigidity in other directions of the slide portion, and is so shaped to have the bending rigidity higher in a first direction in which a load and a bending moment concentrate in the slide portion than the bending rigidity in a second direction, the second direction being perpendicular to the first direction.

2. The undercut processing mechanism as claimed in claim 1, wherein the guide section has at least a second portion being formed to have a shape in which the bending rigidity in a direction conformable to the particular direction of the slide portion is higher as compared with when at least portion thereof is a cylinder or a cylinder having a slit defined in a portion thereof.

3. The undercut processing mechanism as claimed in claim 1, wherein the guide section has one or more flat surfaces in an outer peripheral surface thereof.

4. The undercut processing mechanism as claimed in claim 1, wherein the guide section has one or more wavy surfaces in an outer peripheral surface thereof.

5. The undercut processing mechanism as claimed in claim 1, wherein the guide section has one or more curve shaped surfaces in an outer peripheral surface thereof.

6. The undercut processing mechanism as claimed in claim 1, wherein:
the slide portion and the guide section have respective slide surfaces slidable in contact with each other and lying parallel relative to the first direction of movement of the inclined pin; and
a portion or the whole of the slide surface lies linear when viewed in sectional view.

7. The undercut processing mechanism as claimed in claim 6, wherein a portion or the whole of the slide surface is represented by a linear shape that lies perpendicular to the direction of movement of the molding core and/or parallel thereto.

8. The undercut processing mechanism as claimed in claim 1, wherein the guide section includes a plurality of members each having a slide surface slidable together with the slide portion and constrained while sandwiching at least a portion of the slide portion.

9. The undercut processing mechanism as claimed in claim 1, wherein:
the inclined pin includes a pin main body having one end connecting with the molding core and the other end that is connected with the slide portion; and
each of one end and the other end of the pin main body is provided with male and female screw threads that are counter threaded to each other.

10. The undercut processing mechanism as claimed in claim 1, wherein
the guide section and/or the slide portion have a dovetail groove, and
the guide section guides the slide portion through the dovetail groove.

11. A molding die comprising the undercut processing mechanism as described in claim 1.

12. The undercut processing mechanism as claimed in claim 1, wherein the direction in which the load and the bending moment concentrate in the slide portion comprises a direction of movement of the molding core or a direction of gravitational force of the molding core.

\* \* \* \* \*

UNITED STATES PATENT AND TRADEMARK OFFICE
CERTIFICATE OF CORRECTION

| | | |
|---|---|---|
| PATENT NO. | : 11,059,203 B2 | Page 1 of 1 |
| APPLICATION NO. | : 15/394089 | |
| DATED | : July 13, 2021 | |
| INVENTOR(S) | : Masanori Sorimoto | |

It is certified that error appears in the above-identified patent and that said Letters Patent is hereby corrected as shown below:

In the Claims

Column 23, Line 11:
In Claim 6, after "in" insert -- a --

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*